US012138919B2

(12) United States Patent
Uematsu

(10) Patent No.: US 12,138,919 B2
(45) Date of Patent: Nov. 12, 2024

(54) LIQUID EJECTING APPARATUS

(71) Applicant: SEIKO EPSON CORPORATION, Tokyo (JP)

(72) Inventor: Satoru Uematsu, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 172 days.

(21) Appl. No.: 18/058,890

(22) Filed: Nov. 28, 2022

(65) Prior Publication Data

US 2023/0166503 A1 Jun. 1, 2023

(30) Foreign Application Priority Data

Nov. 30, 2021 (JP) ................................ 2021-194016

(51) Int. Cl.
*B41J 2/045* (2006.01)
*B41J 29/377* (2006.01)
*B41J 29/38* (2006.01)

(52) U.S. Cl.
CPC ....... *B41J 2/04588* (2013.01); *B41J 2/04541* (2013.01); *B41J 29/377* (2013.01); *B41J 29/38* (2013.01)

(58) Field of Classification Search
CPC .. B41J 2/04588; B41J 2/04541; B41J 29/377; B41J 29/38; B41J 2202/08; B41J 2/04551; B41J 2/04563; B41J 2/0457; B41J 2/04581; B41J 2/04593; B41J 2/04596
See application file for complete search history.

(56) References Cited

U.S. PATENT DOCUMENTS 9,586,412 B2 * 3/2017 Otsuka ..................... B41J 29/38
10,737,488 B2 * 8/2020 Hiramatsu ............. B41J 29/377
2004/0218016 A1 * 11/2004 Silverbrook ............. B41J 2/175 347/54
2019/0092061 A1 3/2019 Yamada et al.

FOREIGN PATENT DOCUMENTS

JP 2019-059061 A 4/2019

* cited by examiner

*Primary Examiner* — Thinh H Nguyen
(74) *Attorney, Agent, or Firm* — Global IP Counselors, LLP

(57) ABSTRACT

A liquid ejecting apparatus includes an ejecting unit that ejects liquid when a drive signal is supplied to the ejecting unit, a drive signal output unit that outputs the drive signal, a cooling unit that cools the drive signal output unit, and a power supply unit that supplies power to the cooling unit. The liquid ejecting apparatus has a first mode in which the drive signal output unit outputs a first drive signal of a first frequency, and a second mode in which the drive signal output unit outputs a second drive signal of a second frequency lower than the first frequency. An amount of power supplied by the power supply unit to the cooling unit in the first mode is larger than an amount of power supplied by the power supply unit to the cooling unit in the second mode.

6 Claims, 19 Drawing Sheets

FIG. 8
| [LTa, LTb] ([SIH, SIL]) | S | | | | | | | |
|---|---|---|---|---|---|---|---|---|
| | p1 | | p2 | | p3 | | p4 | |
| [0, 0] | Q1 | PA00 | Q2 | PA10 | Q3 | PA20 | Q4 | PA30 |
| [0, 1] | | PA01 | | PA11 | | PA21 | | PA31 |
| [1, 0] | | PA02 | | PA12 | | PA22 | | PA32 |
| [1, 1] | | PA03 | | PA13 | | PA23 | | PA33 |
FIG. 9
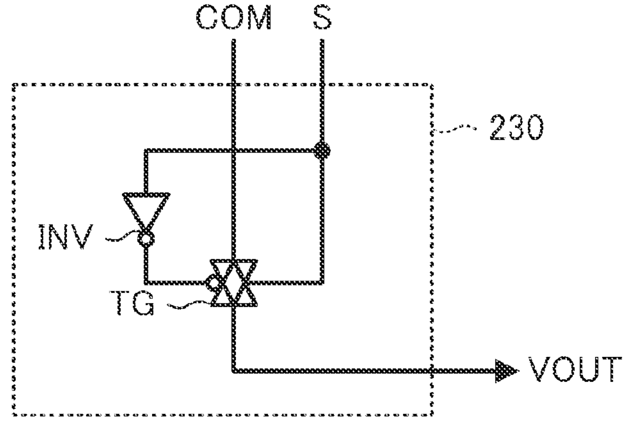
FIG. 10
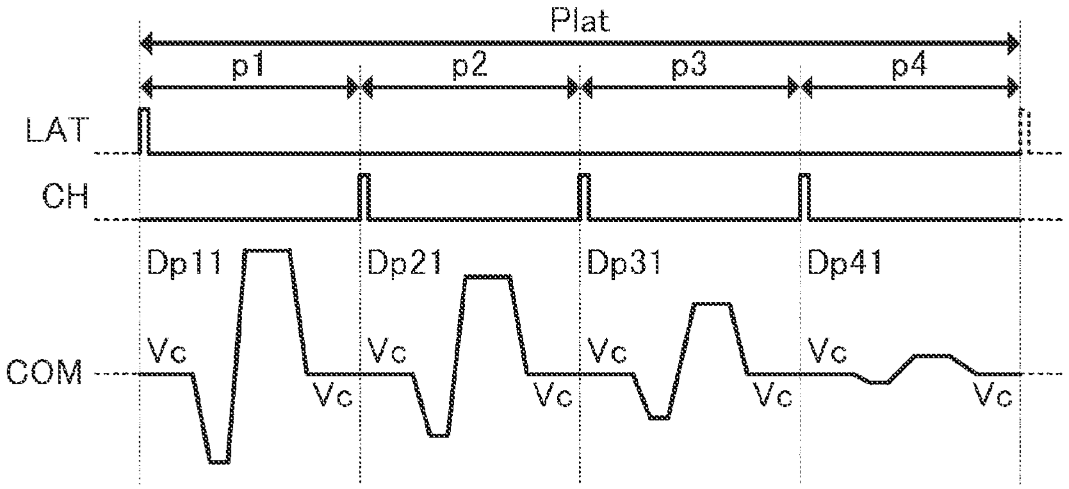

FIG. 12

| [LTa, LTb] ([SIH, SIL]) | S | | | | | | | |
|---|---|---|---|---|---|---|---|---|
| | p1 | | p2 | | p3 | | p4 | |
| [0, 0] | Q1 | 0 | Q2 | 0 | Q3 | 0 | Q4 | 1 |
| [0, 1] | | 0 | | 1 | | 0 | | 0 |
| [1, 0] | | 1 | | 0 | | 1 | | 0 |
| [1, 1] | | 1 | | 1 | | 1 | | 0 |

FIG. 16

| [LTai, LTbi] ([SIHi, SILi]) | S | | | | | | | |
|---|---|---|---|---|---|---|---|---|
| | p1 | | p2 | | p3 | | p4 | |
| [0, 0] | Q1 | 0 | Q2 | 1 | Q3 | 0 | Q4 | 0 |
| [0, 1] | | 1 | | 0 | | 0 | | 0 |
| [1, 0] | | 0 | | 1 | | 0 | | 0 |
| [1, 1] | | 1 | | 0 | | 0 | | 0 |

LIQUID EJECTING APPARATUS

The present application is based on, and claims priority from JP Application Serial Number 2021-194016, filed Nov. 30, 2021, the disclosure of which is hereby incorporated by reference herein in its entirety.

BACKGROUND

1. Technical Field

The present disclosure relates to a liquid ejecting apparatus.

2. Related Art

A liquid ejecting apparatus that forms an image on a medium by ejecting liquid on the medium is known to have, for example, a configuration in which a piezoelectric element or the like is used as a drive element and liquid is ejected onto a medium by driving of the drive element. Electrically, the piezoelectric element as the drive element serves as a capacitive load such as a capacitor. It is necessary to supply a sufficient current to operate a piezoelectric element corresponding to each nozzle. Therefore, the liquid ejecting apparatus includes a drive signal output circuit including an amplifying circuit or the like that outputs a drive signal to drive the piezoelectric element. In general, the drive signal output circuit outputs a large current to operate piezoelectric elements corresponding to nozzles for ejecting liquid and thus generates heat. As a technique for reducing heat generated by such a drive signal output circuit, JP-A-2019-059061 discloses a liquid ejecting apparatus including a drive signal output circuit (drive signal generating circuit) including a heat dissipation mechanism such as a heat conduction sheet.

However, in recent years, there is an increasing demand for further improvement of image qualities of liquid ejecting apparatuses and faster speeds of image formation on media, and heat dissipation measures by the drive signal output circuit described in JP-A-2019-059061 are not sufficient to meet the demand and there has been room for improvement in the technique described in JP-A-2019-059061.

SUMMARY

According to an aspect of the present disclosure, a liquid ejecting apparatus includes an ejecting unit that ejects liquid when a drive signal is supplied to the ejecting unit; a drive signal output unit that outputs the drive signal; a cooling unit that cools the drive signal output unit; and a power supply unit that supplies power to the cooling unit. The liquid ejecting apparatus has a first mode in which the drive signal output unit outputs a first drive signal of a first frequency as the drive signal to the ejecting unit, and a second mode in which the drive signal output unit outputs a second drive signal of a second frequency lower than the first frequency as the drive signal to the ejecting unit. An amount of power supplied by the power supply unit to the cooling unit in the first mode is larger than an amount of power supplied by the power supply unit to the cooling unit in the second mode.

BRIEF DESCRIPTION OF THE DRAWINGS

FIG. 8 is a diagram illustrating an example of details of decoding by decoders included in select signal output units.

FIG. 9 is a diagram illustrating an example of a configuration of a selecting circuit corresponding to the ejecting unit.

FIG. 10 is a diagram illustrating an example of a signal waveform of a drive signal output by a drive signal output circuit in a multi-gradation mode.

FIG. 12 is a diagram illustrating details of decoding by the decoders based on the head control signal illustrated in FIG. 11.

FIG. 16 is a diagram illustrating details of decoding by the decoders based on the head control signal illustrated in FIG. 15.

DESCRIPTION OF EXEMPLARY EMBODIMENTS

Hereinafter, preferred embodiments of the present disclosure are described with reference to the drawings. The drawings used are for convenience of explanation. The embodiments described below do not unduly limit the contents of the present disclosure described in the claims. In addition, not all configurations described below are essential configurations of the present disclosure.

In addition, a liquid ejecting apparatus according to the present disclosure is a printing apparatus that ejects ink as liquid. An ink jet printer is described as an example of the liquid ejecting apparatus according to the present disclosure. However, the liquid ejecting apparatus is not limited to the ink jet printer and may be a color material ejecting apparatus to be used to manufacture a color filter such as a liquid crystal display, an electrode material ejecting apparatus to be used to form an electrode for an organic electroluminescent (EL) display, a surface-emitting display, or the like, a bioorganic material ejecting apparatus to be used to manufacture a biochip, or the like.

1. Overview of Liquid Ejecting Apparatus

Figure 1:
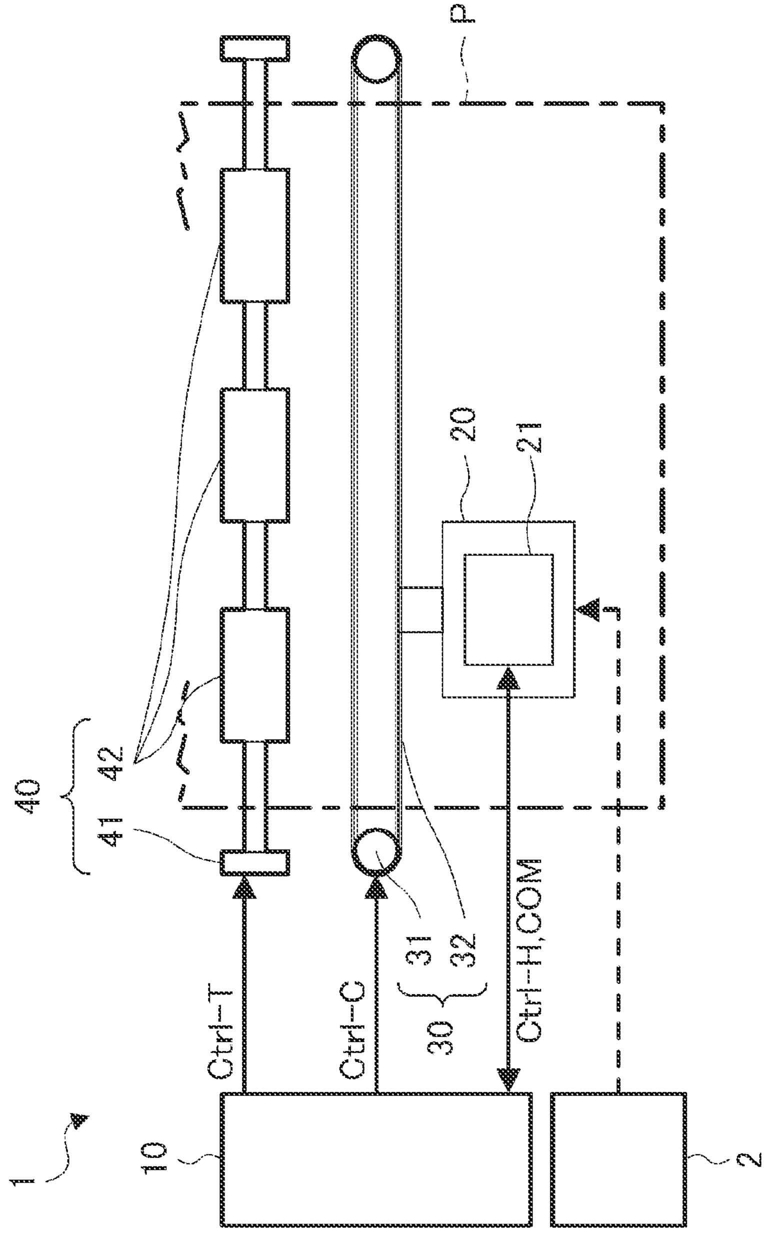
FIG. 1 is a diagram illustrating a schematic structure of a liquid ejecting apparatus.

FIG. 1 is a diagram illustrating a schematic structure of a liquid ejecting apparatus 1. The liquid ejecting apparatus 1 according to the present embodiment transports a medium P in a transport direction and moves a carriage 20 forward and backward in a main scanning direction intersecting the transport direction. An ejecting head 21 mounted on the carriage 20 ejects ink as an example of liquid in coordination with the transport of the medium P and the forward and backward movement of the carriage 20. As a result, the ink lands at a desired position on the medium P, and a desired image is formed on the medium P. That is, the liquid ejecting apparatus 1 according to the present embodiment is a so-called serial printing ink jet printer. In the liquid ejecting apparatus 1, any print matter such as print paper, a resin film, or fabric can be used as the medium P. The liquid ejecting apparatus 1 may be a so-called line printing ink jet printer in which one or a plurality of ejecting heads 21 are arranged such that a nozzle array having a length greater than or equal to a width of the medium P in the main scanning direction is formed, and eject ink onto the medium P transported so as to form a desired image on the medium P.

As illustrated in FIG. 1, the liquid ejecting apparatus 1 includes an ink container 2, a control mechanism 10, the carriage 20, a moving mechanism 30, and a transport mechanism 40.

In the ink container 2, ink of a plurality of colors to be ejected onto the medium P is stored. Examples of the colors of the ink stored in the ink container 2 are black, cyan, magenta, yellow, red, and gray. As the ink container 2, an ink cartridge, a bag-shaped ink pack formed of a flexible film, an ink tank that can be filled with ink, and the like can be used. Although FIG. 1 illustrates a case where the ink container 2 is located at a position different from the position of the carriage 20, the ink container 2 may be mounted on the carriage 20.

The control mechanism 10 includes, for example, a processing circuit such as a central processing unit (CPU) or a field programmable gate array (FPGA) and a storage circuit such as a semiconductor memory. The control mechanism 10 controls each component of the liquid ejecting apparatus 1 including the ejecting head 21.

The ejecting head 21 is mounted on the carriage 20. The carriage 20 is fixed to an endless belt 32 included in the moving mechanism 30.

A control signal Ctrl-H and a drive signal COM are output by the control mechanism 10 and input to the ejecting head 21. The ink stored in the ink container 2 is supplied to the ejecting head 21 through a tube not illustrated or the like. Then, the ejecting head 21 ejects the ink supplied from the ink container 2 based on the input control signal Ctrl-H and the input drive signal COM.

The moving mechanism 30 includes a carriage motor 31 and the endless belt 32. The carriage motor 31 is driven to rotate based on a control signal Ctrl-C input to the carriage motor 31 from the control mechanism 10. The endless belt 32 extends in the main scanning direction and rotates in accordance with the rotational driving of the carriage motor 31. As a result, the carriage 20 fixed to the endless belt 32 moves in the main scanning direction. That is, the control mechanism 10 controls the rotational direction of the carriage motor 31 based on the control signal Ctrl-C, thereby controlling the forward and backward movement of the carriage 20 fixed to the endless belt 32 in the main scanning direction.

The transport mechanism 40 includes a transport motor 41 and a transport roller 42. The transport motor 41 is driven to rotate based on a control signal Ctrl-T input to the transport motor 41 from the control mechanism 10. The transport roller 42 rotates in accordance with the rotational driving of the transport motor 41. The medium P is transported in the transport direction as the transport roller 42 rotates. That is, the control mechanism 10 controls the rotation speed of the transport motor 41 based on the control Ctrl-T, thereby controlling the transport of the medium P in the transport direction.

As described above, in the liquid ejecting apparatus 1 according to the present embodiment, the control mechanism 10 controls the transport of the medium P and controls the forward and backward movement of the carriage 20. In addition, the control mechanism 10 outputs the control signal Ctrl-H and the drive signal COM to the ejecting head 21 in coordination with the transport of the medium P by the transport mechanism 40 and the forward and backward movement of the carriage 20 by the moving mechanism 30. That is, the ejecting head 21 ejects the ink onto the medium P in coordination with the transport of the medium P by the transport mechanism 40 and the forward and backward movement of the carriage 20 moved by the moving mechanism 30. As a result, the ink ejected by the ejecting head 21 lands at a desired position on the medium P and a desired image is formed on the medium P.

2. Functional Configuration of Liquid Ejecting Apparatus

Figure 2:
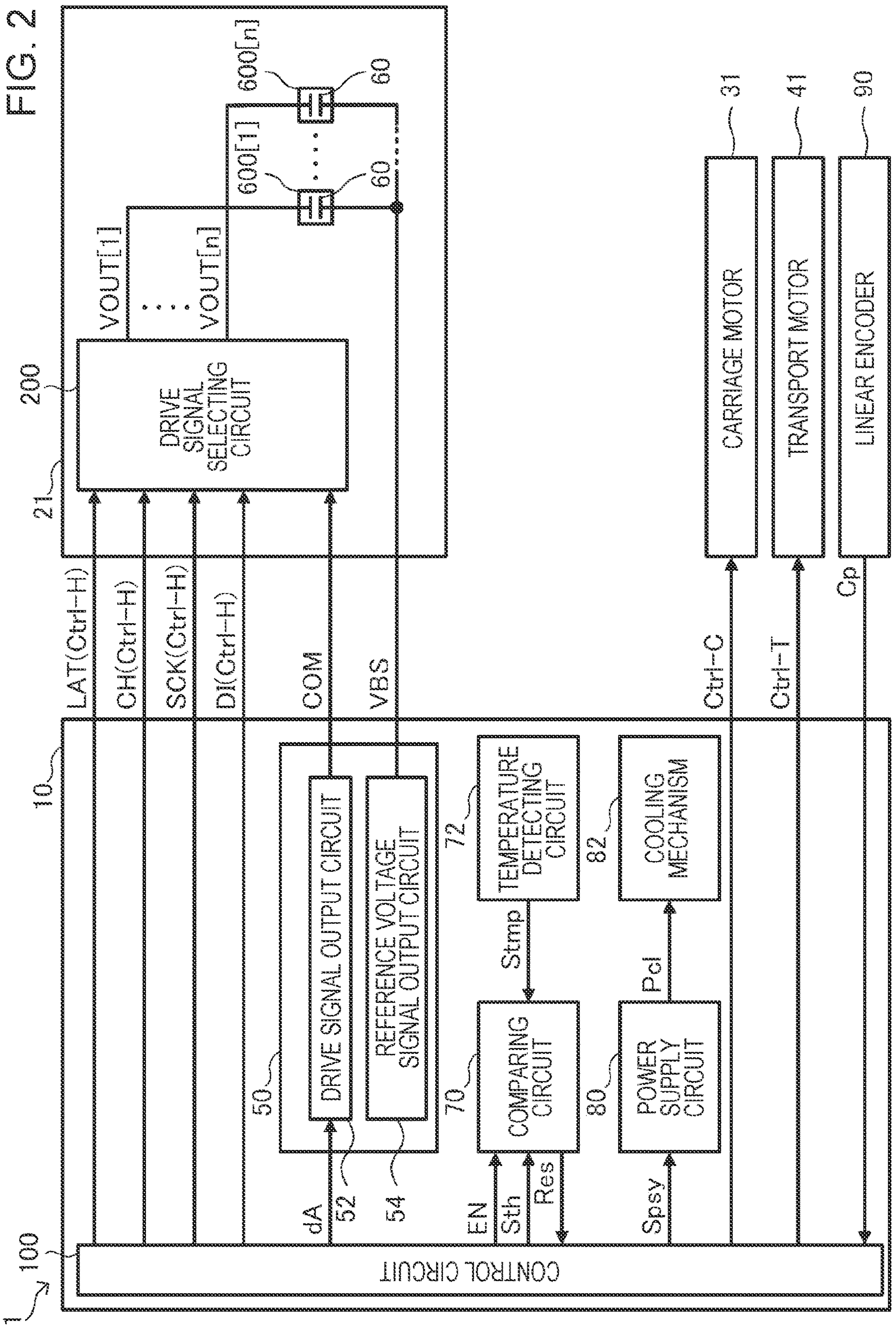
FIG. 2 is a diagram illustrating a functional configuration of the liquid ejecting apparatus.

Next, a functional configuration of the liquid ejecting apparatus 1 is described. FIG. 2 is a diagram illustrating the functional configuration of the liquid ejecting apparatus 1. As illustrated in FIG. 2, the liquid ejecting apparatus 1 includes the control mechanism 10, the ejecting head 21, the carriage motor 31, the transport motor 41, and a linear encoder 90.

The control mechanism 10 includes a drive circuit 50, a comparing circuit 70, a temperature detecting circuit 72, a power supply circuit 80, a cooling mechanism 82, and a control circuit 100.

The control circuit 100 includes, for example, a processor such as a microcontroller and is communicably connected to an external device such as a host computer provided outside the liquid ejecting apparatus 1. The host computer is not illustrated in the drawings. Various signals such as image data including information of an image to be formed on the medium P are input to the control circuit 100 from the external device. The control circuit 100 generates, based on the various signals such as the input image data, various types of data for controlling the liquid ejecting apparatus 1 and various signals based on the data and outputs the generated data and the generated signals to corresponding configurations.

A specific example of the operation of the control circuit 100 is described below.

A positional information signal Cp indicating a scanning position of the carriage 20 detected by the linear encoder 90 is input to the control circuit 100. The control circuit 100 recognizes a scanning position of the ejecting head 21 mounted on the carriage 20 based on the input positional information signal Cp. The control circuit 100 generates various signals including the control signals Ctrl-C, Ctrl-T, and Ctrl-H according to the image data input from the external device and the positional information signal Cp input from the linear encoder 90 and outputs the generated signals to corresponding configurations.

Specifically, the control circuit 100 generates the control signal Ctrl-C to control the forward and backward movement of the ejecting head 21 based on the positional information signal Cp and outputs the generated control signal Ctrl-C to the carriage motor 31. As a result, the scanning position of the ejecting head 21 in the main scanning direction is controlled. In addition, the control circuit 100 generates the control signal Ctrl-T to control the transport of the medium P and outputs the control signal Ctrl-T to the transport motor 41. As a result, a position to which the medium P is transported is controlled. After the control signal Ctrl-C output by the control circuit 100 is converted by a driver circuit not illustrated, the converted control signal Ctrl-C may be input to the carriage motor 31. Similarly, after the control signal Ctrl-T output by the control circuit 100 is converted by a driver circuit not illustrated, the converted control signal Ctrl-T may be input to the transport motor 41.

In addition, the control circuit 100 generates a latch signal LAT, a change signal CH, a clock signal SCK, and a head control signal DI as the control signal Ctrl-H to control the ejecting head 21 based on the input image data and the positional information signal Cp, and outputs the latch signal LAT, the change signal CH, the clock signal SCK, and the head control signal DI to the ejecting head 21. The latch signal LAT, the change signal CH, the clock signal SCK, and the head control signal DI are described later in detail.

In addition, the control circuit 100 outputs, to the drive circuit 50, a basic drive signal dA that is a digital signal. The drive circuit 50 includes a drive signal output circuit 52 and a reference voltage signal output circuit 54. The basic drive signal dA is input to the drive signal output circuit 52. After converting the input basic drive signal dA from a digital signal to an analog signal, the drive signal output circuit 52 performs D-class amplification on the converted analog signal to generate the drive signal COM. The drive signal output circuit 52 outputs the generated drive signal COM to the ejecting head 21. That is, the basic drive signal dA is a digital signal to define a signal waveform of the drive signal COM. The drive signal output circuit 52 performs the D-class amplification on the signal waveform defined by the basic drive signal dA to generate the drive signal COM.

It suffices for the basic drive signal dA to define the signal waveform of the drive signal COM. The basic drive signal dA may be an analog signal. In addition, it suffices for the drive signal output circuit 52 to amplify the signal waveform defined by the basic drive signal dA and output the drive signal COM. Therefore, the drive signal output circuit 52 may perform A-class amplification, B-class amplification, or AB-class amplification on the signal waveform defined by the basic drive signal dA to generate the drive signal COM.

The reference voltage signal output circuit 54 generates a reference voltage signal VBS as a reference potential for driving piezoelectric elements 60 included in the ejecting head 21. The piezoelectric elements 60 are described later. Then, the reference voltage signal output circuit 54 outputs the generated reference voltage signal VBS to the ejecting head 21. The reference voltage signal VBS is a signal of a certain potential and may be, for example, a signal of a ground potential of 0 V or may be a signal of a direct current voltage of 5.5 V, 6 V, or the like.

The temperature detecting circuit 72 detects the temperature of each unit of the liquid ejecting apparatus 1 including the drive circuit 50. The temperature detecting circuit 72 outputs a temperature information signal Stmp including a detected temperature Tmp to the comparing circuit 70. As the temperature detecting circuit 72, a thermistor element or the like that has a resistance value that changes with a change in the temperature can be used. In the following description, the temperature detecting circuit 72 detects the temperature of the drive signal output circuit 52 included in the drive circuit 50 in the liquid ejecting apparatus 1 according to the present embodiment. However, the temperature detecting circuit 72 may detect not only the temperature of the drive signal output circuit 52 but also the temperature of each unit of the liquid ejecting apparatus 1, such as the temperature of the control circuit 100, the temperature of each unit of the moving mechanism 30, and the temperature of each unit of the transport mechanism 40. In this case, the liquid ejecting apparatus 1 may include a plurality of temperature detecting circuits 72.

The temperature information signal Stmp output by the temperature detecting circuit 72 and a temperature threshold signal Sth output by the control circuit 100 are input to the comparing circuit 70. Then, the comparing circuit 70 compares a threshold temperature Tth included in the temperature threshold signal Sth with the detected temperature Tmp included in the temperature information signal Stmp and outputs a temperature determination signal Res indicating a result of the comparison to the control circuit 100. As the comparing circuit 70, for example, a comparator can be used. The comparing circuit 70 may include a processor such as a microcontroller. A part of the comparing circuit 70 or the entire comparing circuit 70 may be integrated with the control circuit 100.

In addition, an enable signal EN output by the control circuit 100 is input to the comparing circuit 70. When the input enable signal EN indicates validity, the comparing circuit 70 compares the threshold temperature Tth with the detected temperature Tmp. When the input enable signal EN indicates invalidity, the comparing circuit 70 does not compare the threshold temperature Tth with the detected temperature Tmp. In the present embodiment, when the input enable signal EN is at a high level, the comparing circuit 70 compares the threshold temperature Tth with the detected temperature Tmp. In the present embodiment, when the input enable signal EN is at a low level, the comparing circuit 70 does not compare the threshold temperature Tth with the detected temperature Tmp. That is, in the present embodiment, when the enable signal EN is at a high level, the enable signal EN indicates validity. In the present embodiment, when the enable signal EN is at a low level, the enable signal EN indicates invalidity. When the enable signal EN is at a high level, the enable signal EN may indicate invalidity. When the enable signal EN is at a low level, the enable signal EN may indicates validity. In the following description, when logic levels of various signals are a high level, the high level may be referred to as an H level, and when the logic levels of the various signals are a low level, the low level may be referred to as an L level.

A power control signal Spsy output by the control circuit 100 is input to the power supply circuit 80. The power supply circuit 80 generates cooling power Pcl that is power corresponding to the input power control signal Spsy. The power supply circuit 80 supplies the generated cooling power Pcl to the cooling mechanism 82. Specifically, the power supply circuit 80 changes at least one of a voltage value and a current value of the cooling power Pcl to be supplied to the cooling mechanism 82 based on the input power control signal Spsy. As a result, the power supply circuit 80 adjusts the amount of power to be supplied to the cooling mechanism 82. In the following description, the power supply circuit 80 controls the voltage value of the cooling power Pcl to control the amount of power that is the cooling power Pcl to be supplied to the cooling mechanism 82.

The cooling mechanism 82 operates with the cooling power Pcl supplied. As a result, the cooling mechanism 82 cools each unit of the liquid ejecting apparatus 1 including the drive signal output circuit 52. As the cooling mechanism 82, a fan, a Peltier element, or the like that can control a cooling capacity according to the amount of power that is the cooling power Pcl supplied can be used. The cooling mechanism 82 may cool not only the drive signal output circuit 52 but also the control circuit 100, each unit of the moving mechanism 30, and each unit of the transport mechanism 40. In this case, the liquid ejecting apparatus 1 may include a plurality of cooling mechanisms 82.

The ejecting head 21 includes a drive signal selecting circuit 200 and ejecting units 600[1] to 600[*n*].

The drive signal selecting circuit 200 includes one or a plurality of integrated circuit devices. The latch signal LAT, the change signal CH, the clock signal SCK, the head control signal DI, and the drive signal COM are input to the drive signal selecting circuit 200. The drive signal selecting circuit 200 selects or does not select a signal waveform of the drive signal COM based on the input latch signal LAT, the input change signal CH, the input clock signal SCK, and the input head control signal DI to generate drive signals VOUT[1] to VOUT[n] corresponding to the ejecting units 600[1] to 600[*n*] and outputs the generated drive signals VOUT[1] to VOUT[n] to the ejecting units 600[1] to 600[*n*]. The configuration and operation of the drive signal selecting circuit 200 are described later in detail.

The ejecting units 600[1] to 600[*n*] included in the ejecting head 21 have the same configuration. When it is not necessary to distinguish the ejecting units 600[1] to 600[*n*], the ejecting units 600[1] to 600[*n*] may be merely referred to as ejecting units 600. In the following description, a drive signal VOUT among the drive signals VOUT[1] to VOUT [n] is supplied to an ejecting unit 600 among the ejecting units 600.

Figure 3:
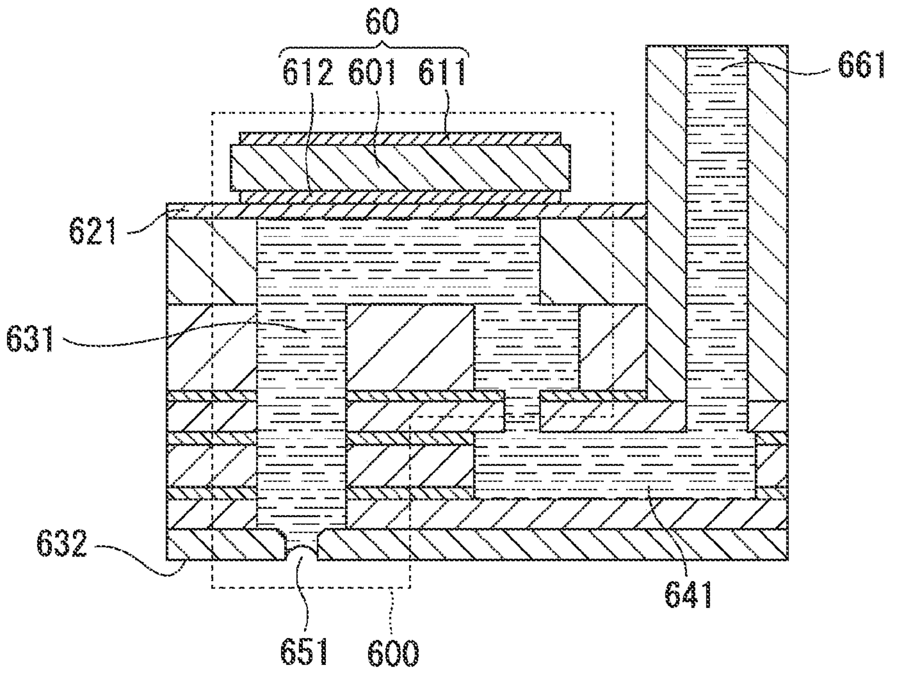
FIG. 3 is a diagram illustrating a schematic configuration of an ejecting unit.

Next, the configuration of the ejecting unit 600 to which the drive signal VOUT is supplied is described. FIG. 3 is a diagram illustrating a schematic configuration of the ejecting unit 600. FIG. 3 also illustrates a nozzle plate 632, a reservoir 641, and a supply port 661 in addition to the ejecting unit 600.

As illustrated in FIG. 3, the ejecting unit 600 includes a piezoelectric element 60, a vibration plate 621, a cavity 631, and a nozzle 651. The piezoelectric element 60 includes a piezoelectric body 601 and electrodes 611 and 612. The piezoelectric element 60 is configured such that the electrodes 611 and 612 are located to sandwich the piezoelectric body 601. The piezoelectric element 60 is driven such that a central portion of the piezoelectric element 60 is deformed in a vertical direction according to a potential difference between a voltage supplied to the electrode 611 and a voltage supplied to the electrode 612. Specifically, the drive signal VOUT based on the drive signal COM is supplied to the electrode 611, and the reference voltage signal VBS is supplied to the electrode 612. When the voltage value of the drive signal VOUT supplied to the electrode 611 is changed, a potential difference between the drive signal VOUT supplied to the electrode 611 and the reference voltage signal VBS supplied to the electrode 612 changes, and as a result, the piezoelectric element 60 is driven such that the central portion of the piezoelectric element 60 is deformed in the vertical direction.

The vibration plate 621 is located under the piezoelectric element 60 illustrated in FIG. 3. In other words, in FIG. 3, the piezoelectric element 60 is formed on an upper surface of the vibration plate 621. The vibration plate 621 is deformed in the vertical direction due to the driving of the piezoelectric element 60 in the vertical direction.

In FIG. 3, the cavity 631 is located under the vibration plate 621. The ink is supplied to the cavity 631 from the reservoir 641. The ink stored in the ink container 2 is introduced into the reservoir 641 through the supply port 661. That is, the inside of the cavity 631 is filled with the ink stored in the ink container 2. The internal volume of the cavity 631 increases or decreases with the deformation of the vibration plate 621 in the vertical direction. That is, the vibration plate 621 functions as a diaphragm that changes the internal volume of the cavity 631. The cavity 631 functions as a pressure chamber in which pressure changes with the deformation of the vibration plate 621 in the vertical direction.

The nozzle 651 is an opening provided in the nozzle plate 632 and communicates with the cavity 631. When the internal volume of the cavity 631 changes, the ink with which the inside of the cavity 631 is filled is ejected from the nozzle 651 according to the change in the internal volume.

In the ejecting unit 600 configured in the above-described manner, when the piezoelectric element 60 is driven to bend upward, the vibration plate 621 is deformed upward. Therefore, the internal volume of the cavity 631 increases, and as a result, the ink stored in the reservoir 641 is drawn into the cavity 631. On the other hand, when the piezoelectric element 60 is driven to bend downward, the vibration plate 621 is deformed downward. As a result, the internal volume of the cavity 631 decreases, and the ink in an amount corresponding to the decrease in the internal volume of the cavity 631 is ejected from the nozzle 651.

Since it suffices for the piezoelectric element 60 to be driven when the drive signal VOUT based on the drive signal COM is supplied to the piezoelectric element 60, and have a structure that enables the ink to be ejected from the nozzle 651 by the driving of the piezoelectric element 60, the structure of the piezoelectric element 60 is not limited to the structure illustrated in FIG. 3.

As described above, the liquid ejecting apparatus 1 according to the present embodiment includes the ejecting units 600 that eject the ink when the drive signals VOUT based on the drive signal COM are supplied to the ejecting units 600, the drive signal output circuit 52 that outputs the drive signal COM that is the basis of the drive signals VOUT, the cooling mechanism 82 that cools the drive signal output circuit 52, the power supply circuit 80 that supplies power to the cooling mechanism 82, the temperature detecting circuit 72 that detects the temperature of the drive signal output circuit 52, and the comparing circuit 70 that compares the detected temperature Tmp indicating the result of the detection by the temperature detecting circuit 72 with the threshold temperature Tth. When the drive signals VOUT based on the drive signal COM output by the drive signal output circuit 52 are supplied to the ejecting units 600, the ink is ejected from the ejecting units 600 and lands on the medium P to form an image on the medium P.

3. Configuration of Drive Signal Selecting Circuit

Figure 4:
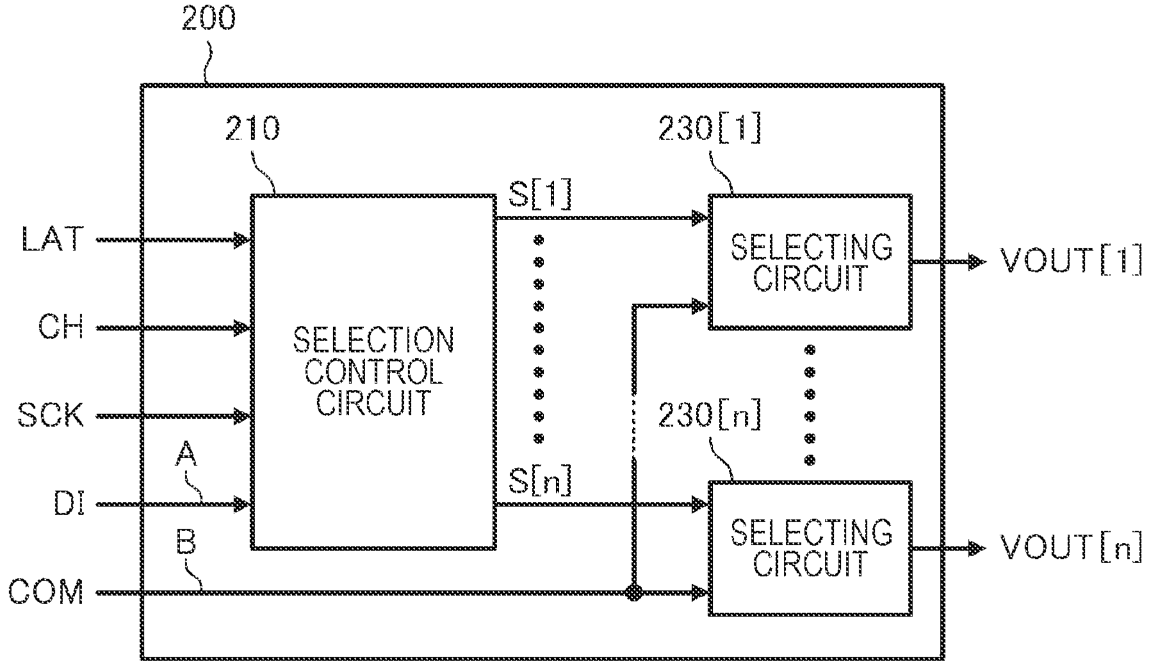
FIG. 4 is a diagram illustrating an example of a configuration of a drive signal selecting circuit.

Next, the configuration of the drive signal selecting circuit 200 is described. FIG. 4 is a diagram illustrating an example of the configuration of the drive signal selecting circuit 200. As illustrated in FIG. 4, the drive signal selecting circuit 200 includes a selection control circuit 210 and selecting circuits 230[1] to 230[*n*].

The clock signal SCK, the latch signal LAT, the change signal CH, and the head control signal DI are input to the selection control circuit 210. The selection control circuit 210 generates select signals S[1] to S[n] based on the clock signal SCK, the latch signal LAT, the change signal CH, and the head control signal DI and outputs the generated select signals S[1] to S[n] to the corresponding selecting circuits 230[1] to 230[*n*].

The selecting circuits 230[1] to 230[*n*] are provided corresponding to the ejecting units 600[1] to 600[*n*], respectively. The drive signal COM is input to the selecting circuits 230[1] to 230[*n*]. In addition, the select signals S[1] to S[n] are input to the selecting circuits 230[1] to 230[*n*], respectively. The selecting circuits 230[1] to 230[*n*] select or do not select the drive signal COM based on the input select signals S[1] to S[n] to generate the corresponding drive signals VOUT[1] to VOUT[n], respectively, and output the generated drive signals VOUT[1] to VOUT[n] to the corresponding ejecting units 600[1] to 600[*n*], respectively.

Specifically, the select signal S[i] (i is any of 1 to n) output by the selection control circuit 210 and the drive signal COM are input to the selecting circuit 230[*i*]. Then, the selecting circuit 230[*i*] selects or does not select the drive signal COM based on the select signal S[i] to generate a drive signal VOUT[i] and outputs the generated drive signal VOUT[i] to the ejecting unit 600[*i*].

The selecting circuits 230[1] to 230[*n*] have the same configuration. When it is not necessary to distinguish the selecting circuits 230[1] to 230[*n*], each of the selecting circuits 230[1] to 230[*n*] may be merely referred to as a selecting circuit 230. In the following description, the selecting circuit 230 is provided corresponding to an ejecting unit 600 among the ejecting units 600[1] to 600[*n*] and a select signal S among the select signals S[1] to S[n] is input to the selecting circuit 230.

The configuration of the drive signal selecting circuit 200 configured in the above-described manner is described below in detail. First, the configuration of the selection control circuit 210 included in the drive signal selecting circuit 200 is described in detail. Before a detailed configuration of the selection control circuit 210 is described, a specific example of the latch signal LAT, the change signal CH, the clock signal SCK, and the head control signal DI that are input to the selection control circuit 210 is described below.

Figure 5:
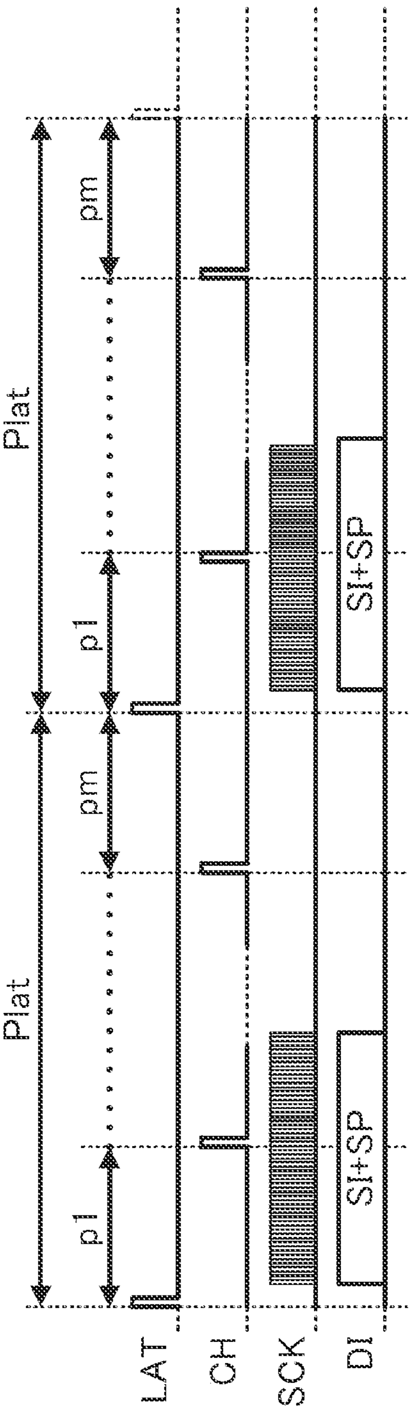
FIG. 5 is a diagram describing a specific example of a latch signal, a change signal, a clock signal, and a head control signal.

FIG. 5 is a diagram describing the specific example of the latch signal LAT, the change signal CH, the clock signal SCK, and the head control signal DI.

As illustrated in FIG. 5, the latch signal LAT is a pulse signal that is output by the control circuit 100 in each latch cycle Plat. The control circuit 100 generates the latch signal LAT based on the positional information signal Cp indicating the scanning position of the carriage 20 and input to the control circuit 100 from the linear encoder 90 and outputs the latch signal LAT to the drive signal selecting circuit 200.

The change signal CH is a pulse signal to divide a latch cycle Plat into a number m of time periods p1 to pm. The control circuit 100 determines the number of time periods into which the latch cycle Plat is divided according to an operational mode of the liquid ejecting apparatus 1 described later and a signal waveform of the drive signal COM. Then, the control circuit 100 outputs the change signal CH to the drive signal selecting circuit 200. In the following description, in the liquid ejecting apparatus 1 according to the present embodiment, the control circuit 100 outputs the change signal CH up to three times in the latch cycle Plat. That is, in the present embodiment, the control circuit 100 divides the latch cycle Plat into up to four time periods p1 to p4. The maximum number of time periods into which the latch cycle Plat is divided is not limited to four. The latch cycle Plat may be divided into five or more or three or less according to the operational mode of the liquid ejecting apparatus 1 described later and the signal waveform of the drive signal COM.

The head control signal DI is synchronized with the clock signal SCK and includes an ejection control signal SI and a setting information signal SP in series. The ejection control signal SI defines amounts of the ink to be ejected from the nozzles 651 included in the ejecting units 600[1] to 600[*n*]. The setting information signal SP defines relationships between the amounts of the ink to be ejected and the ejection control signal SI in the time periods p1 to pm defined by the latch signal LAT and the change signal CH. The control circuit 100 generates the head control signal DI based on image data input from the external device and outputs the generated head control signal DI in each latch cycle Plat.

That is, in the liquid ejecting apparatus 1 according to the present embodiment, the latch cycle Plat is defined by the latch signal LAT based on the scanning position of the carriage 20 on which the ejecting head 21 is mounted, the change signal CH is used to divide the latch cycle Plat into the plurality of time periods p1 to pm, and the head control signal DI defines the amounts of the ink to be ejected in each of the time periods p1 to pm defined by the latch signal LAT and the change signal CH. Therefore, a dot of a size defined by the head control signal DI is formed on the medium P in each latch cycle Plat. That is, the latch cycle Plat in which the dot of the size defined by the head control signal DI is formed on the medium P corresponds to a dot formation cycle in the liquid ejecting apparatus 1.

Figure 6:
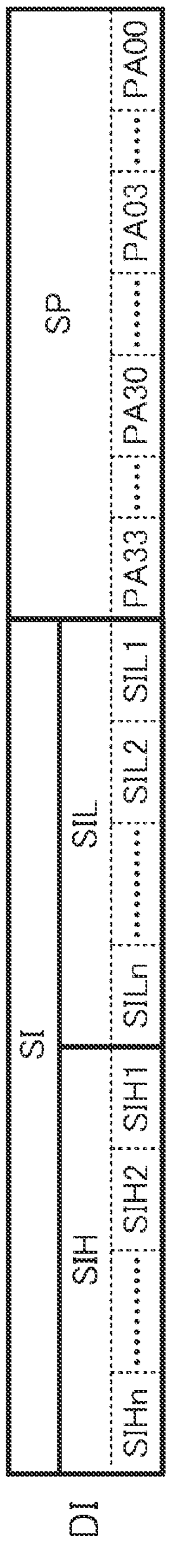
FIG. 6 is a diagram illustrating an example of a data configuration of the head control signal.

A specific example of the head control signal DI including the ejection control signal SI and the setting information signal SP is described with reference to FIG. 6. FIG. 6 is a diagram illustrating an example of a data configuration of the head control signal DI. As illustrated in FIG. 6, the head control signal DI includes the ejection control signal SI and the setting information signal SP in series.

The ejection control signal SI includes, in series, upper-level ejection data SIH1 to SIHn and lower-level ejection data SIL1 to SILn that individually define the amounts of the ink to be ejected from the nozzles 651 included in the ejecting units 600[1] to 600[*n*].

Specifically, the ejection control signal SI includes, in series, the upper-level ejection data SIH1 corresponding to the ejecting unit 600[1], the upper-level ejection data SIH2 corresponding to the ejecting unit 600[2], . . . , the upper-level ejection data SIHn−1 corresponding to the ejecting unit 600[*n*−1], and the upper-level ejection data SIHn corresponding to the ejecting unit 600[*n*] in the order of the upper-level ejection data SIHn, SIHn−1, . . . , SIH2, and SIH1. In addition, the ejection control signal SI includes, in series, the lower-level ejection data SIL1 corresponding to the ejecting unit 600[1], the lower-level ejection data SIL2 corresponding to the ejecting unit 600[2], . . . , the lower-level ejection data SILn−1 corresponding to the ejecting unit 600[*n*−1], and the lower-level ejection data SILn corresponding to the ejecting unit 600[*n*] in the order of the lower-level ejection data SILn, SILn−1, . . . , SIL2, and SIL1.

In this case, the upper-level ejection data SIHn, SIHn−1, . . . , SIH2, and SIH1 and the lower-level ejection data SILn, SILn−1, . . . , SIL2, and SIL1 are included in series in the ejection control signal SI in the order of the upper-level ejection data SIHn, SIHn−1, . . . , SIH2, and SIH1 and the lower-level ejection data SILn, SILn−1, . . . , SIL2, and SIL1. That is, the ejection control signal SI includes up to data of 2n bits.

In this case, the amount of the ink to be ejected from the nozzle 651 corresponding to the ejecting unit 600[*i*] is defined by 2 bits of the upper-level ejection data SIHi and the lower-level ejection data SILi. In this case, the upper-level ejection data SIHi and the lower-level ejection data SILi may be collectively referred to as ejection data [SIHi, SILi].

In the following description, each of the ejecting units 600 corresponds to upper-level ejection data SIH and lower-level ejection data SIL. That is, the amount of the ink to be ejected from the ejecting unit 600 is defined by 2 bits of the upper-level ejection data SIH and the lower-level ejection data SIL. In this case, the upper-level ejection data SIH and the lower-level ejection data SIL may be collectively referred to as ejection data [SIH, SIL].

The setting information signal SP includes information defining relationships between the ejection control signal SI in each of the time periods p1 to pm and the amounts of the ink to be ejected from the nozzles 651. Specifically, the setting information signal SP defines relationships between combinations of logic levels of the ejection data [SIH, SIL] included in the ejection control signal SI and logic levels of the select signals S to be input to the corresponding selecting circuits 230.

Specifically, the setting information signal SP includes setting data PA00 to PA03, setting data PA10 to PA13, setting data PA20 to PA23, and setting data PA30 to PA33. The setting data PA00 to PA03 define relationships between logic levels that indicate driving patterns of the piezoelectric elements 60 included in the ejecting units 600 in the time period p1 and are logic levels of select signals S in the time period p1, and combinations of logic levels of the ejection data [SIH, SIL]. The setting data PA10 to PA13 define relationships between logic levels that indicate driving patterns of the piezoelectric elements 60 included in the ejecting unit 600 in the time period p2 and are logic levels of select signals S in the time period p2, and combinations of logic levels of the ejection data [SIH, SIL]. The setting data PA20 to PA23 define relationships between logic levels that indicate driving patterns of the piezoelectric elements 60 included in the ejecting units 600 in the time period p3 and are logic levels of select signals S in the time period p3, and combinations of logic levels of the ejection data [SIH, SIL]. The setting data PA30 to PA33 define relationships between logic levels that indicate driving patterns of the piezoelectric elements 60 included in the ejecting units 600 in the time period p4 and are logic levels of select signals S in the time period p4, and combinations of logic levels of the ejection data [SIH, SIL].

The setting data PA00 to PA03, PA10 to PA13, PA20 to PA23, and PA30 to PA33 are included in series in the setting information signal SP in the order of the setting data PA33, PA32, PA31, PA30, PA23, PA22, PA21, PA20, PA13, PA12, PA11, PA10, PA03, PA02, PA01, and PA00. In the following description, the setting information signal SP according to the present embodiment includes 16-bit data that is the setting data PA00 to PA03, PA10 to PA13, PA20 to PA23, and PA30 to PA33. However, the amount of the data included in the setting information signal SP is not limited to 16 bits.

As described above, the latch signal LAT, the change signal CH, the head control signal DI, and the clock signal SCK are input to the selection control circuit 210. The latch signal LAT defines the latch cycle Plat corresponding to the dot formation cycle. The latch cycle Plat is divided into the time periods p1 to pm according to the change signal CH. The head control signal DI includes, in series, the ejection control signal SI defining the amounts of the ink to be ejected onto the medium P from the number n of nozzles 651 in each of the time periods p1 to pm, and the setting information signal SP defining the relationships between the ejection control signal SI and the driving patterns of the piezoelectric elements 60. The clock signal SCK is used to transfer the head control signal DI. The selection control circuit 210 generates the select signals S[1] to S[n] corresponding to the ejecting units 600[1] to 600[*n*] based on the input latch signal LAT, the input change signal CH, the input clock signal SLK, and the input head control signal DI and outputs the generated select signals S[1] to S[n] to the corresponding selecting circuits 230[1] to 230[*n*].

Figure 7:
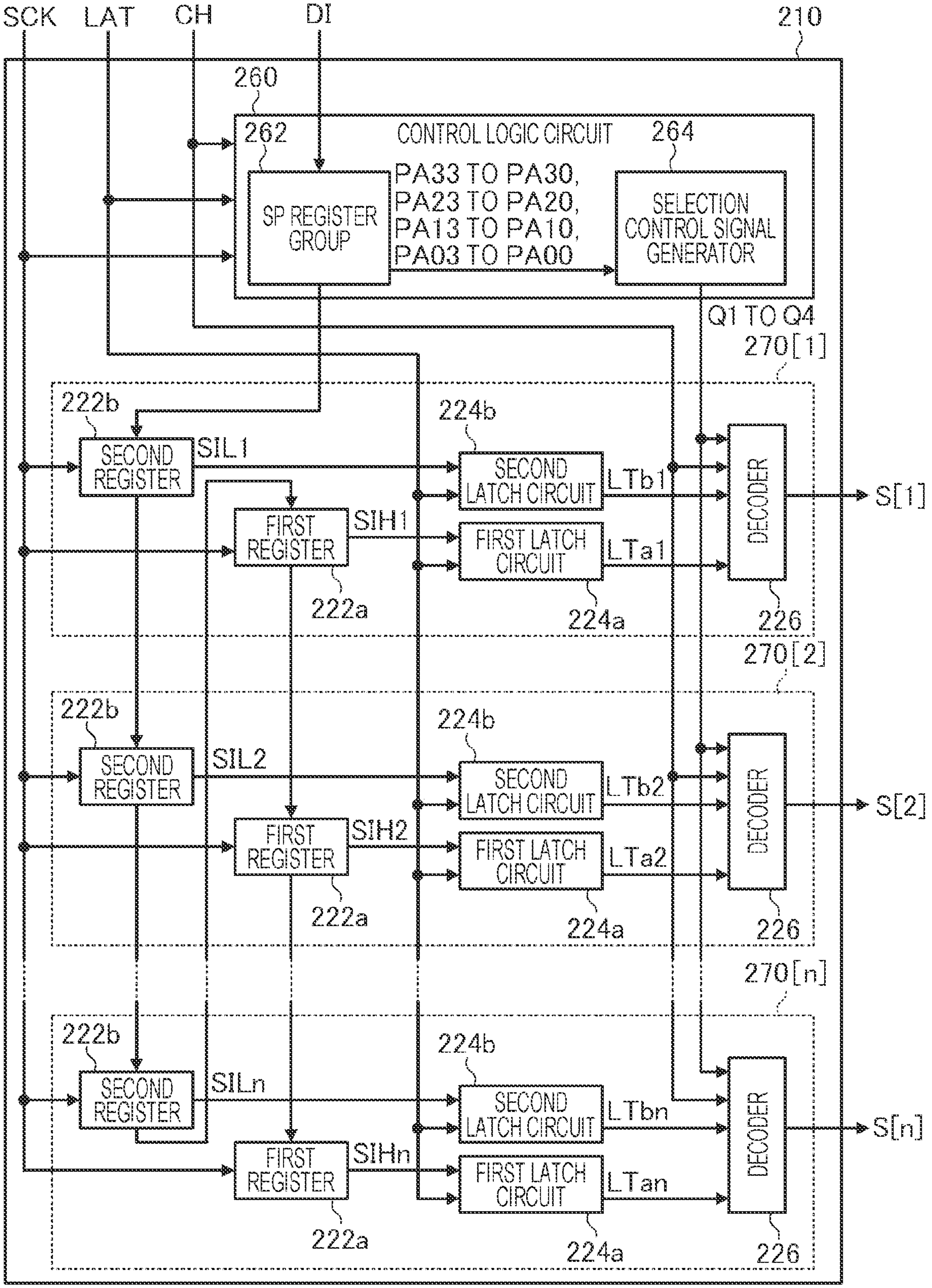
FIG. 7 is a diagram illustrating an example of a functional configuration of a selection control circuit.

Next, a specific example of the configuration of the selection control circuit 210 is described. FIG. 7 is a diagram illustrating an example of a functional configuration of the selection control circuit 210. As illustrated in FIG. 7, the selection control circuit 210 includes a control logic circuit 260 and select signal output units 270[1] to 270[*n*] provided corresponding to the ejecting units 600[1] to 600[*n*]. The selection control circuit 210 generates the select signals S[1] to S[n] corresponding to the ejecting units 600[1] to 600[*n*] based on the head control signal DI in each of the time periods p1 to p4 defined by the latch signal LAT and the change signal CH and outputs the generated select signals S[1] to S[n].

The control logic circuit 260 includes an SP register group 262 and a selection control signal generator 264.

The SP register group 262 includes a plurality of registers coupled to each other in series. The head control signal DI is synchronized with the clock signal SCK and input to the SP register group 262. The SP register group 262 synchronizes the head control signal DI with the clock signal SCK and sequentially transfers the head control signal DI to the registers at subsequent stages. That is, the SP register group 262 includes a so-called shift register.

When the supply of the clock signal SCK is stopped, the setting data PA33 to PA30, PA23 to PA20, PA13 to PA10, and PA03 to PA00 included in the setting information signal SP in the head control signal DI are held in the SP register group 262. When the latch signal LAT rises, the selection control signal generator 264 simultaneously latches the setting data PA33 to PA30, PA23 to PA20, PA13 to PA10, and PA03 to PA 00 held in the SP register group 262. Then, the selection control signal generator 264 generates setting signals Q1 to Q4 based on the latched setting data PA33 to PA30, PA23 to PA20, PA13 to PA10, and PA03 to PA00, and outputs the generated setting signals Q1 to Q4.

Specifically, the selection control signal generator 264 generates the setting signal Q1 including the setting data PA00 to PA03, the setting signal Q2 including the setting data PA10 to PA13, the setting signal Q3 including the setting data PA20 to PA23, and the setting signal Q4 including the setting data PA30 to PA33, and outputs the setting signals Q1 to Q4 to decoders 226 included in the select signal output units 270[1] to 270[*n*].

The setting signal Q1 defines a relationship between a combination of logic levels of the ejection data [SIH, SIL] in the time period p1 and the logic levels of the select signals S based on the setting data PA00 to PA03. The setting signal Q2 defines a relationship between a combination of logic levels of the ejection data [SIH, SIL] in the time period p2 and the logic levels of the select signals S based on the setting data PA10 to PA13. The setting signal Q3 defines a relationship between a combination of logic levels of the ejection data [SIH, SIL] in the time period p3 and the logic levels of the select signals S based on the setting data PA20 to PA23. The setting signal Q4 defines a relationship between a combination of logic levels of the ejection data [SIH, SIL] in the time period p4 and the logic levels of the select signals S based on the setting data PA30 to PA33.

In the following description, the setting signal Q1 including the setting data PA00 to PA03 may be referred to as a setting signal Q1[PA00, PA01, PA02, PA03], the setting signal Q2 including the setting data PA10 to PA13 may be referred to as a setting signal Q2[PA10, PA11, PA12, PA13], the setting signal Q3 including the setting data PA20 to PA23 may be referred to as a setting signal Q3[PA20, PA21, PA22, PA23], and the setting signal Q4 including the setting data PA30 to PA33 may be referred to as a setting signal Q4[PA30, PA31, PA32, PA33].

Each of the select signal output units 270[1] to 270[*n*] includes a first register 222*a*, a second register 222*b*, a first latch circuit 224*a*, a second latch circuit 224*b*, and a decoder 226. In the following description, when it is not necessary to distinguish the select signal output units 270[1] to 270[*n*], the select signal output units 270[1] to 270[*n*] may be referred to as select signal output units 270. In the following description, the select signal output units 270 are provided corresponding to the ejecting units 600.

The second register 222*b* included in the select signal output unit 270[1] is coupled to the SP register group 262 and located at the subsequent stage of the SP register group 262. The second register 222*b* included in the select signal output unit 270[2] is coupled to the second register 222*b* included in the select signal output unit 270[1] and is located at the subsequent stage of the second register 222*b* included in the select signal output unit 270[1]. The second register 222*b* included in the select signal output unit 270[*i*] is coupled to the second register 222*b* included in the select signal output unit 270[*i*−1] and is located at the subsequent stage of the second register 222*b* included in the select signal output unit 270[*i*−1].

In addition, the first register 222*a* included in the select signal output unit 270[1] is coupled to the second register 222*b* included in the select signal output unit 270[*n*] and is located at the subsequent stage of the second register 222*b* included in the select signal output unit 270[*n*]. The first register 222*a* included in the select signal output unit 270[2] is coupled to the first register 222*a* included in the select signal output unit 270[1] and is located at the subsequent stage of the first register 222*a* included in the select signal output unit 270[1]. The first register 222*a* included in the select signal output unit 270[*i*] is coupled to the first register 222*a* included in the select signal output unit 270[*i*−1] and is located at the subsequent stage of the first register 222*a* included in the select signal output unit 270[*i*−1]. The first register 222*a* included in the select signal output unit 270[*n*] is coupled to the first register 222*a* included in the select signal output unit 270[*n*−1] and is located at the subsequent stage of the first register 222*a* included in the select signal output unit 270[*n*−1].

That is, the second registers 222*b* included in the select signal output units 270[1] to 270[*n*] are coupled to each other in series in the order of the second register 222*b* included in the select signal output unit 270[1], the second register 222*b* included in the select signal output unit 270[2], . . . , and the second register 222*b* included in the select signal output unit 270[*n*]. The first registers 222*a* included in the select signal output units 270[1] to 270[*n*] are coupled to each other in series in the order of the first register 222*a* included in the select signal output unit 270[1], the first register 222*a* included in the select signal output unit 270[2], . . . , and the first register 222*a* included in the select signal output unit 270[*n*]. In the selection control circuit 210, the plurality of registers included in the SP register group 262 and coupled to each other in series, the second registers 222*b* included in the select signal output units 270[1] to 270[*n*] and coupled to each other in series, and the first registers 222*a* included in the select signal output units 270[1] to 270[*n*] and coupled to each other in series are coupled to each other in series in the order of the plurality of registers included in the SP register group 262 and coupled to each other in series, the second registers 222*b* included in the select signal output units 270[1] to 270[*n*] and coupled to each other in series, and the first registers 222*a* included in the select signal output units 270[1] to 270[*n*] and coupled to each other in series. That is, the plurality of registers included in the SP register group 262, the second registers 222*b* included in the select signal output units 270[1] to 270[*n*], and the first registers 222*a* included in the select signal output units 270[1] to 270[*n*] constitute the shift register. Therefore, the head control signal DI input to the selection control circuit 210 is synthesized with the clock signal SCK and transferred to the SP register group 262, the number n of second registers 222*b* included in the select signal output units 270[1] to [n], and the number n of first registers 222*a* included in the select signal output units 270[1] to 270[*n*] in this order.

After that, when the supply of the clock signal SCK is stopped, the lower-level ejection data SIL corresponding to the ejecting units 600 is held in the second registers 222*b* included in the select signal output units 270, and the upper-level ejection data SIH corresponding to the ejecting units 600 is held in the first registers 222*a* included in the select signal output units 270.

Then, when the latch signal LAT rises, the upper-level ejection data SIH held in the first registers 222*a* included in the select signal output units 270 is latched by the first latch circuits 224*a* included in the select signal output units 270, and the lower-level ejection data SIL held in the second registers 222*b* included in the select signal output units 270 is latched by the second latch circuits 224*b* included in the select signal output units 270. The first latch circuits 224*a* included in the select signal output units 270 output the latched upper-level ejection data SIH as latched data LTa to the decoders 226 included in the select signal output units 270, and the second latch circuits 224*b* included in the select signal output units 270 output the latched lower-level ejection data SIL as latched data LTb to the decoders 226 included in the select signal output units 270.

In the following description, the latched data LTai and the latched data LTbi input to the decoder 226 included in the select signal output unit 270[*i*] may be collectively referred to as latched data [LTai, LTbi], and the latched data LTa and the latched data LTb input to the decoders 226 included in the select signal output units 270 may be collectively referred to as latched data [LTa, LTb].

The setting signal Q1[PA00, PA01, PA02, PA03], the setting signal Q2[PA10, PA11, PA12, PA13], the setting signal Q3[PA20, PA**2*l*, PA22, PA23], and the setting signal Q4[PA30, PA3*l*, PA32, PA33] output by the selection control signal generator 264, and the latched data [LTa, LTb] corresponding to the ejection data [SIH, SIL] are input to the decoders 226 included in the select signal output units 270. Then, the decoders 226 included in the select signal output units 270 decode the latched data [LTa, LTb] based on the setting signals Q1 to Q4 to generate the select signals S, and output the generated select signals S to the selecting circuits 230**.

FIG. 8 is a diagram illustrating an example of details of decoding by the decoders 226 included in the select signal output units 270. As illustrated in FIG. 8, the decoders 226 included in the select signal output units 270 output select signals S obtained by decoding the input latched data [LTa, LTb] based on the setting signal Q1[PA00, PA01, PA02, PA03] in the time period p1, output select signals S obtained by decoding the input latched data [LTa, LTb] based on the setting signal Q2[PA10, PA11, PA12, PA13] in the time period p2, output select signals S obtained by decoding the input latched data [LTa, LTb] based on the setting signal Q3[PA20, PA21, PA22, PA23] in the time period p3, and output select signals S obtained by decoding the input latched data [LTa, LTb] based on the setting signal Q4[PA30, PA31, PA32, PA33] in the time period p4.

Specifically, for example, when the latched data [LTa, LTb]=[0, 1] corresponding to the ejection data [SIH, SIL]=[0, 1] is input to the decoders 226 included in the select signal output units 270, the decoders 226 included in the select signal output units 270 decode the latched data [LTa, LTb]=[0, 1], output select signals S of the logic level defined by the setting data PA01 in the time period p1, output select signals S of the logic level defined by the setting data PA11 in the time period p2, output select signals S of the logic level defined by the setting data PA21 in the time period p3, and output the select signals S of the logic level defined by the setting data PA31 in the time period p4. That is, the details of the decoding by the decoders 226 included in the select signal output units 270 are defined by the setting signals Q1 to Q4 output by the selection control signal generator 264.

Next, a configuration of each of the selecting circuits 230[1] to 230[*n*] to which the select signals S[1] to S[n] are input, respectively, is described. FIG. 9 is a diagram illustrating an example of the configuration of the selecting circuit 230 corresponding to the ejecting unit 600. As illustrated in FIG. 9, the selecting circuit 230 includes an inverter INV and a transfer gate TG. The inverter INV is a NOT circuit.

The select signal S output by the selection control circuit 210 is input to a positive control terminal of the transfer gate TG. The positive control terminal of the transfer gate TG is not marked with a circle in FIG. 9. After the logic level of the select signal S is inverted by the inverter INV, the select signal S output by the selection control circuit 210 and inverted by the inverter INV is input to a negative control terminal of the transfer gate TG. The negative control terminal is marked with a circle in FIG. 9. The drive signal COM is supplied to an input terminal of the transfer gate TG.

When the select signal S at an H level is input to the selecting circuit 230, the input terminal of the transfer gate TG is set to be conductive with the output terminal of the transfer gate TG. When the select signal S at an L level is input to the selecting circuit 230, the input terminal of the transfer gate TG is set to be non-conductive with the output terminal of the transfer gate TG. That is, when the H-level select signal S is input to the selecting circuit 230, the selecting circuit 230 outputs, from the output terminal of the selecting circuit 230, the drive signal COM supplied to the input terminal of the transfer gate TG as the drive signal VOUT. When the L-level select signal S is input to the selecting circuit 230, the selecting circuit 230 does not output, from the output terminal of the selecting circuit 230, the drive signal COM supplied to the input terminal of the transfer gate TG as the drive signal VOUT. That is, the selecting circuit 230 switches whether to output the drive signal COM as the drive signal VOUT according to the logic level of the input select signal S.

In the drive signal selecting circuit 200 configured in the above-described manner, the selection control circuit 210 generates the select signals S[1] to S[n] corresponding to the selecting circuits 230[1] to 230[*n*] based on the head control signal DI in each of the time periods p1 to p4 defined by the latch signal LAT and the change signal CH, and outputs the generated select signals S[1] to S[n] to the corresponding selecting circuits 230[1] to 230[*n*]. The selecting circuits 230[1] to 230[*n*] switch whether to output the drive signal COM as the drive signals VOUT[1] to VOUT[n] according to the logic levels of the input select signals S[1] to S[n]. As a result, amounts of the ink from the ejecting units 600[1] to 600[*n*] are individually controlled.

The drive signal selecting circuit 200 includes the selecting circuits 230. The head control signal DI and the drive signal COM are input to the drive signal selecting circuit 200. The head control signal DI includes the setting information signal SP to set a rule for selecting a signal waveform included in the drive signal COM and the ejection control signal SI to define amounts of the ink to be ejected from the ejecting units 600 and control gray levels of dots to be formed by ejecting the ink from the ejecting units 600. The setting information signal SP includes the setting signal Q1 and the setting signal Q2. The selecting circuits 230 switch, based on the setting information signal SP and the ejection control signal SI, whether to supply the signal waveform of the drive signal COM to the ejecting units 600. In other words, the liquid ejecting apparatus 1 includes a wiring A illustrated in FIG. 4, a wiring B illustrated in FIG. 4, and the selecting circuits 230. The head control signal DI is transferred to the drive signal selecting circuit 200 through the wiring A. The head control signal DI includes the setting information signal SP to set the rule for selecting a signal waveform included in the drive signal COM and the ejection control signal SI to define amounts of the ink to be ejected from the ejecting units 600 and control gray levels of dots to be formed by ejecting the ink from the ejecting units 600. The drive signal COM is transferred to the drive signal selecting circuit 200 through the wiring B. The selecting circuits 230 switch, based on the setting information signal SP and the ejection control signal SI, whether to supply the signal waveform of the drive signal COM to the ejecting units 600.

4. Operational Modes of Liquid Ejecting Apparatus

The liquid ejecting apparatus 1 configured in the above-described manner according to the present embodiment has a multi-gradation mode and a binary mode as operational modes for forming an image on the medium P.

The multi-gradation mode is an operational mode for forming a high-resolution image on the medium P. Specifically, in the latch cycle Plat, the multi-gradation mode is implemented by causing the ejecting head 21 to eject the ink onto the medium P a plurality of times to increase the number of gray levels of dots formed on the medium P. The binary mode is an operational mode for forming an image on the medium P at a high speed. Specifically, in the latch cycle Plat, the binary mode is implemented by ejecting the ink onto the medium P a smaller number of times than in the multi-gradation mode so as to reduce an ejection frequency at which the ink is ejected onto the medium P.

In the present embodiment, when the liquid ejecting apparatus 1 operates in the multi-gradation mode, high-resolution image formation on the medium P is implemented by controlling the gradation of dots to be formed on the medium P with four gray levels, which correspond to a large dot, a middle dot, a small dot, and non-ejection. When the liquid ejecting apparatus 1 operates in the binary mode, high-speed image formation on the medium P is implemented by controlling the gradation of dots to be formed on the medium P with two gray levels, which correspond to execution and non-execution of dot formation. That is, the number of gray levels of dots formed on the medium P in the binary mode is smaller than the number of gray levels of dots formed on the medium P in the multi-gradation mode, and a speed at which a dot is formed on the medium P in the binary mode is higher than a speed at which a dot is formed on the medium P in the multi-gradation mode.

The liquid ejecting apparatus 1 may be required to form a high-resolution image or may be required to form an image at a high speed, depending on the use of the liquid ejecting apparatus 1, the type of medium P, and the like. Since the liquid ejecting apparatus 1 according to the present embodiment has the multi-gradation mode and the binary mode as operational modes for forming an image on the medium P, the liquid ejecting apparatus 1 according to the present embodiment can select an operational mode suitable for the use of the liquid ejecting apparatus 1. As a result, the convenience for the user is improved and the versatility of the liquid ejecting apparatus 1 is improved. Specific examples of the multi-gradation mode and the binary mode of the liquid ejecting apparatus 1 are described below.

In the following description of logic levels of various data, bit data of an H-level signal may be described as “1” and bit data of an L-level signal may be described as “0”.

4.1 Multi-Gradation Mode

First, an example of an operation of the liquid ejecting apparatus 1 when the operational mode of the liquid ejecting apparatus 1 is the multi-gradation mode is described below.

FIG. 10 is a diagram illustrating an example of the signal waveform of the drive signal COM output by the drive signal output circuit 52 in the multi-gradation mode. As illustrated in FIG. 10, in the multi-gradation mode, the drive signal COM has a signal waveform in which a trapezoidal waveform Dp11 set in the time period p1, a trapezoidal waveform Dp21 set in the time period p2, a trapezoidal waveform Dp31 set in the time period p3, and a trapezoidal waveform Dp41 set in the time period p4 are continuous.

The trapezoidal waveform Dp11 is a signal waveform that causes a predetermined amount of ink to be ejected from a nozzle 651 corresponding to a piezoelectric element 60 when the trapezoidal waveform Dp11 is supplied to the electrode 611 of the piezoelectric element 60. The trapezoidal waveform Dp21 is a signal waveform that causes a certain amount of ink smaller than the predetermined amount to be ejected from the nozzle 651 corresponding to the piezoelectric element 60 when the trapezoidal waveform Dp21 is supplied to the electrode 611 of the piezoelectric element 60. The trapezoidal waveform Dp31 is a signal waveform that causes an amount of ink smaller than the certain amount to be ejected from the nozzle 651 corresponding to the piezoelectric element 60 when the trapezoidal waveform Dp31 is supplied to the electrode 611 of the piezoelectric element 60. The trapezoidal waveform Dp41 is a signal waveform that prevents ink from being ejected from the nozzle 651 corresponding to the piezoelectric element 60 and causes ink in the vicinity of the opening of the nozzle 651 to vibrate so as to reduce the possibility of increasing the viscosity of the ink in the vicinity of the nozzle 651 when the trapezoidal waveform Dp41 is supplied to the electrode 611 of the piezoelectric element 60.

Each of the trapezoidal waveforms Dp11, Dp21, Dp31, and Dp41 of the drive signal COM starts at a voltage Vc and ends at the voltage Vc. That is, the voltages of the trapezoidal waveforms Dp11, Dp21, Dp31, and Dp41 when the trapezoidal waveforms Dp11, Dp21, Dp31, and Dp41 start and end are the common voltage Vc.

In the following description, the amount of ink that is ejected from the nozzle 651 when the trapezoidal waveform Dp11 is supplied to the electrode 611 may be referred to as a large amount, the amount of ink that is ejected from the nozzle 651 when the trapezoidal waveform Dp21 is supplied to the electrode 611 may be referred to as a middle amount, and the amount of ink that is ejected from the nozzle 651 when the trapezoidal waveform Dp31 is supplied to the electrode 611 may be referred to as a small amount. In addition, an operation of vibrating ink in the vicinity of the opening of the nozzle 651 when the trapezoidal waveform Dp41 is supplied to the electrode 611 may be referred to as slight vibration, and the trapezoidal waveform Dp41 that causes the slight vibration to be performed may be referred to as a slight vibration waveform.

As described above, in the multi-gradation mode, the drive signal COM includes the trapezoidal waveforms Dp11, Dp12, Dp13, Dp14 set in the time periods p1 to p4. Therefore, the control circuit 100 outputs the change signal CH to divide the latch cycle Plat into the four time periods so that each of the trapezoidal waveforms Dp11, Dp21, Dp31, and Dp41 set in the time periods p1 to p4 is selectable.

In the multi-gradation mode, the drive signal selecting circuit 200 generates the drive signals VOUT[1] to VOUT[n] by selecting or not selecting each of the trapezoidal waveforms Dp11, Dp21, Dp31, and Dp41 included in the drive signal COM based on the head control signal DI in each of the time periods p1 to p4 defined by the latch signal LAT and the change signal CH and outputs the generated drive signals VOUT[1] to VOUT[n] to the corresponding ejecting units 600[1] to 600[*n*].

Figure 11:
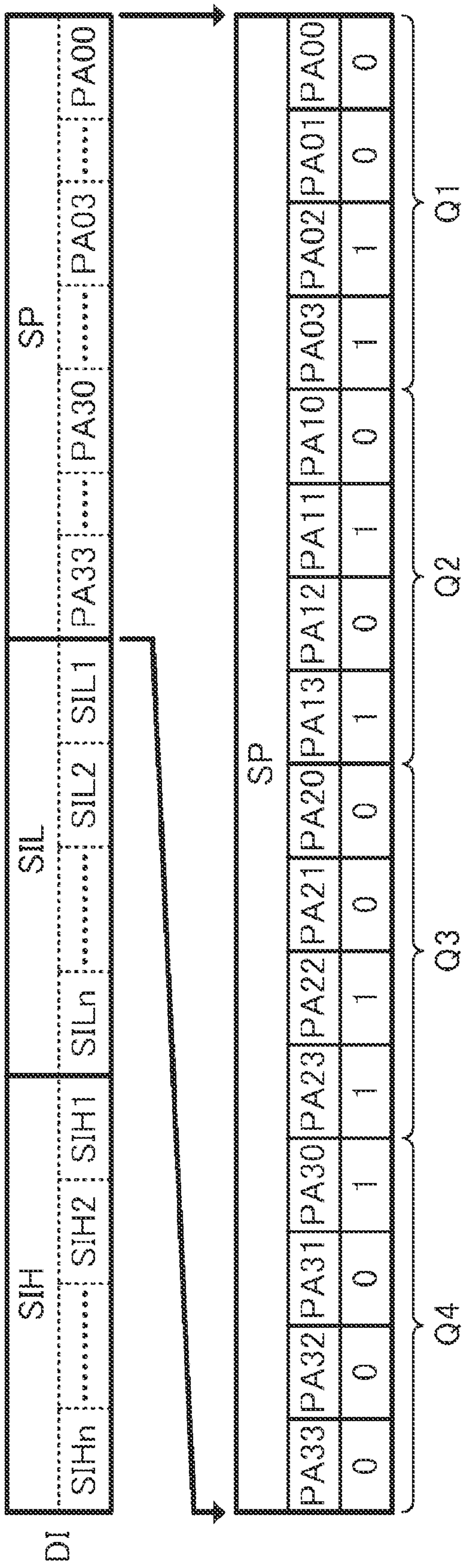
FIG. 11 is a diagram illustrating an example of the head control signal in the multi-gradation mode.

FIG. 11 is a diagram illustrating an example of the head control signal DI in the multi-gradation mode.

As described above, the ejection control signal SI included in the head control signal DI defines amounts of the ink to be ejected from the nozzles 651 included in the ejecting units 600[1] to 600[*n*]. Therefore, the logic level of the ejection control signal SI in the multi-gradation mode appropriately changes according to the amounts of the ink to be ejected from the corresponding nozzles 651 in a time period in which the liquid ejecting apparatus 1 performs so-called printing control of ejecting the ink onto the medium P.

As illustrated in FIG. 11, in the multi-gradation mode, the setting information signal SP included in the head control signal DI includes, in series, "0" as the setting data PA33, "0" as the setting data PA32, "0" as the setting data PA31, "1" as the setting data PA30, "1" as the setting data PA23, "1" as the setting data PA22, "0" as the setting data PA21, "0" as the setting data PA20, "1" as the setting data PA13, "0" as the setting data PA12, "1" as the setting data PA11, "0" as the setting data PA10, "1" as the setting data PA03, "1" as the setting data PA02, "0" as the setting data PA01, and "0" as the setting data PA00.

That is, in the present embodiment, when the operational mode of the liquid ejecting apparatus 1 is the multi-gradation mode, the head control signal DI including the 16-bit setting information signal SP having a logic level "0001 1100 1010 1100" is input to the drive signal selecting circuit 200.

After the setting information signal SP input to the drive signal selecting circuit 200 is held in the SP register group 262, when the latch signal LAT rises, the setting information signal SP is collectively latched by the selection control signal generator 264. Then, the selection control signal generator 264 generates, from the latched setting information signal SP, the setting signal Q1[PA00, PA01, PA02, PA03]=[0, 0, 1, 1], the setting signal Q2[PA10, PA11, PA12, PA13]=[0, 1, 0, 1], the setting signal Q3[PA20, PA21, PA22, PA23]=[0, 0, 1, 1], and the setting signal Q4[PA30, PA31, PA32, PA33]=[1, 0, 0, 0], and outputs the generated setting signals Q1 to Q4 to the decoders 226 included in the select signal output units 270[1] to 270[*n*].

As described above, details of decoding by the decoders 226 included in the select signal output units 270 are defined by the setting signals Q1 to Q4 output by the selection control signal generator 264. FIG. 12 is a diagram illustrating the details of the decoding by the decoders 226 based on the head control signal DI illustrated in FIG. 11. The decoders 226 included in the select signal output units 270 decode the latched data [LTa, LTb] corresponding to the input ejection data [SIH, SIL] based on the details illustrated in FIG. 12 and output the select signals S of predetermined logic levels.

For example, when the latched data [LTa, LTb]=[1, 0] corresponding to the ejection data [SIH, SIL]=[1, 0] is input to the decoders 226 included in the select signal output units 270, the decoders 226 included in the select signal output units 270 output H-level select signals S in the time period p1, output L-level select signals S in the time period p2, output H-level select signals S in the time period p3, and output L-level select signals S in the time period p4.

Figure 13:
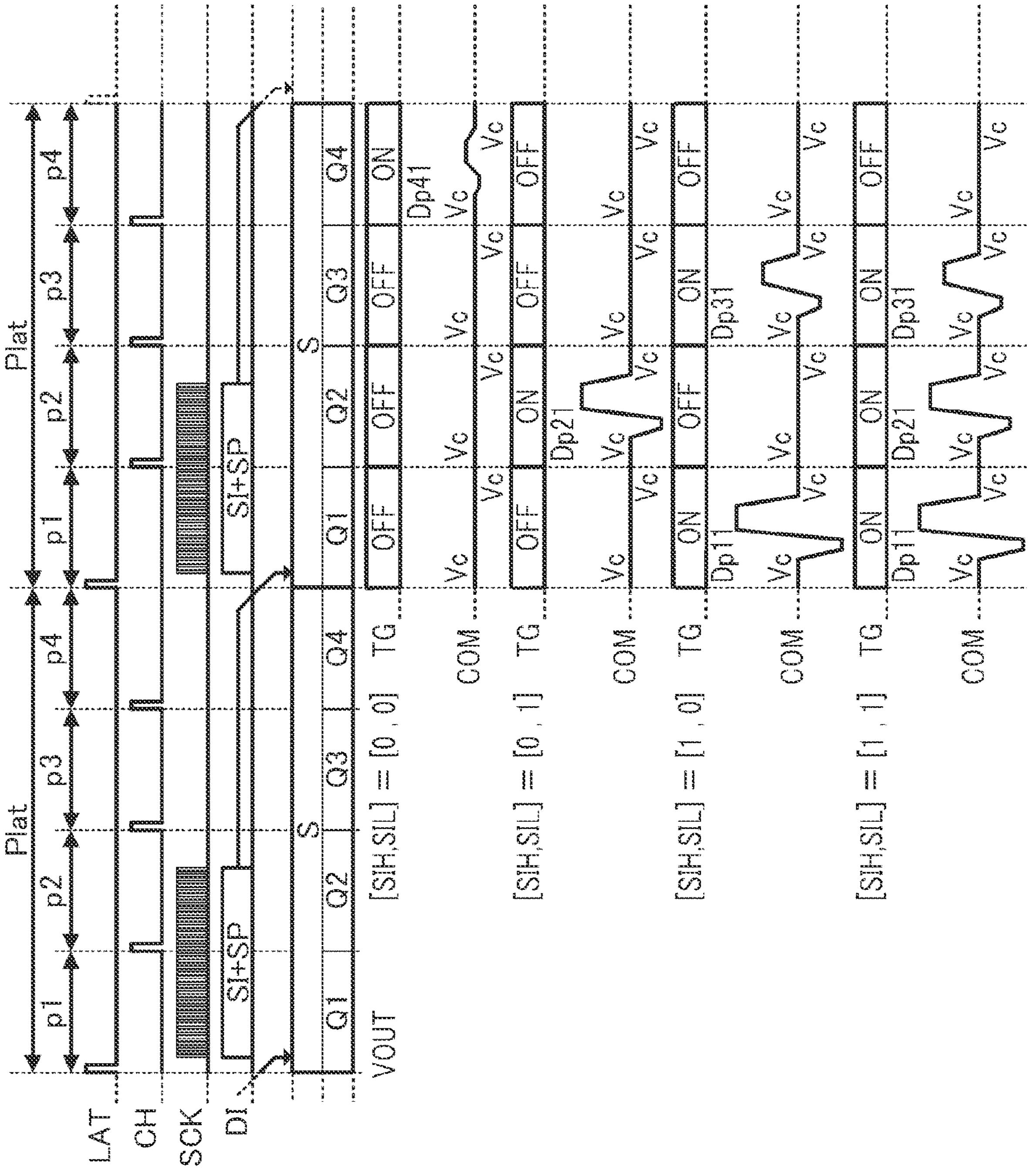
FIG. 13 is a diagram describing an operation of the drive signal selecting circuit in the multi-gradation mode.

FIG. 13 is a diagram describing an operation of the drive signal selecting circuit 200 in the multi-gradation mode. The head control signal DI input to the drive signal selecting circuit 200 is synchronized with the clock signal SCK and sequentially transferred to the plurality of registers included in the SP register group 262, the second registers 222*b* included in the select signal output units 270[1] to 270[*n*], and the first registers 222*a* included in the select signal output units 270[1] to 270[*n*].

When the supply of the clock signal SCK is stopped, the setting data PA33 to PA30, PA23 to PA20, PA13 to PA10, and PA03 to PA00 included in the setting information signal SP are held in the plurality of registers included in the SP register group 262, the lower-level ejection data SIL1 to SILn included in the ejection control signal SI are held in the second registers 222*b* included in the select signal output units 270[1] to 270[*n*], and the upper-level ejection data SIH1 to SIHn included in the ejection control signal SI are held in the first registers 222*a* included in the select signal output units 270[1] to 270[*n*].

After that, when the latch signal LAT rises, the setting data PA33 to PA30, PA23 to PA20, PA13 to PA10, and PA03 to PA00 held in the plurality of registers included in the SP register group 262 are simultaneously latched by the selection control signal generator 264, the lower-level ejection data SIL1 to SILn held in the second registers 222*b* included in the select signal output units 270[1] to 270[*n*] are simultaneously latched by the second latch circuits 224*b* included in the select signal output units 270[1] to 270[*n*], and the upper-level election data SIH1 to SIHn held in the first registers 222*a* included in the select signal output units 270[1] to 270[*n*] are simultaneously latched by the first latch circuits 224*a* included in the select signal output units 270[1] to 270[*n*].

The selection control signal generator 264 generates the setting signals Q1 to Q4 from the latched setting data PA33 to PA30, PA23 to PA20, PA13 to PA10, and PA03 to PA00 and outputs the generated setting signals Q1 to Q4 to the decoders 226 included in the select signal output units 270[1] to 270[*n*]. In addition, the second latch circuits 224*b* included in the select signal output units 270[1] to 270[*n*] output the latched lower-level ejection data SIL1 to SILn as latched data LTb1 to LTbn to the corresponding decoders 226, and the first latch circuits 224*a* included in the select signal output units 270[1] to 270[*n*] output the latched upper-level ejection data SIH1 to SIHn as latched data LTa1 to LTan to the corresponding decoders 226.

That is, the setting signal Q1[PA00, PA01, PA02, PA03]=[0, 0, 1, 1], the setting signal Q2[PA10, PA11, PA12, PA13]=[0, 1, 0, 1], the setting signal Q3[PA20, PA21, PA22, PA23]=[0, 0, 1, 1], and the setting signal Q4[PA30, PA31, PA32, PA33]=[1, 0, 0, 0] output by the selection control signal generator 264, and the latched data [LTa, LTb] output by the first latch circuits 224*a* and the second latch circuits 224*b* included in the select signal output units 270 are input to the decoders 226 included in the select signal output units 270.

The decoders 226 included in the select signal output units 270 decode the input latched data [LTa, LTb] based on the details illustrated in FIG. 12. As a result, the decoders 226 included in the select signal output units 270 output select signals S of predetermined logic levels according to logic levels of the input latched data [LTa, LTb] and the setting signals Q1 to Q4.

Specifically, when the ejection data [SIH, SIL]=[0, 0], that is, when the latched data [LTa, LTb]=[0, 0] is input to the decoders 226 included in the select signal output units 270, the decoders 226 included in the select signal output units 270 output L-level select signals S in the time period p1, output L-level select signals S in the time period p2, output L-level select signals S in the time period p3, and output H-level select signals S in the time period p4. Therefore, each of the corresponding selecting circuits 230 is controlled such that the input terminal of the selecting circuit 230 is not conductive with the output terminal of the selecting circuit 230 in the time periods p1, p2, and p3 and is conductive with the output terminal of the selecting circuit 230 in the time period p4. As a result, the drive signal selecting circuit 200 outputs a drive signal VOUT whose voltage is the fixed voltage Vc in the time periods p1, p2, and p3 and forms the trapezoidal waveform Dp41 in the time period p4. In this case, only ink in the vicinity of the nozzles 651 included in the corresponding ejecting units 600 vibrates and ink is not ejected from the nozzles 651.

When the ejection data [SIH, SIL]=[0, 1], that is, when the latched data [LTa, LTb]=[0, 1] is input to the decoders 226 included in the select signal output units 270, the decoders 226 included in the select signal output units 270 output L-level select signals S in the time period p1, output H-level select signals S in the time period p2, output L-level select signals S in the time period p3, and output L-level select signals S in the time period p4. Therefore, each of the corresponding selecting circuits 230 is controlled such that the input terminal of the selecting circuit 230 is not conductive with the output terminal of the selecting circuit 230 in the time period p1, is conductive with the output terminal of the selecting circuit 230 in the time period p2, is not conductive with the output terminal of the selecting circuit 230 in the time period p3, and is not conductive with the output terminal of the selecting circuit 230 in the time period p4. As a result, the drive signal selecting circuit 200 outputs a drive signal VOUT whose voltage is the fixed voltage Vc in the time period p1, forms the trapezoidal waveform Dp21 in the time period p2, is the fixed voltage Vc in the time period p3, and is the fixed voltage Vc in the time period p4. In this case, the middle amount of ink is ejected from each of the nozzles 651 included in the corresponding ejecting units 600.

When the ejection data [SIH, SIL]=[1, 0], that is, when the latched data [LTa, LTb]=[1, 0] is input to the decoders 226 included in the select signal output units 270, the decoders 226 included in the select signal output units 270 output H-level select signals S in the time period p1, output L-level select signals S in the time period p2, output H-level select signals S in the time period p3, and output L-level select signals S in the time period p4. Therefore, each of the corresponding selecting circuit 230 is controlled such that the input terminal of the selecting circuit 230 is conductive with the output terminal of the selecting circuit 230 in the time period p1, is not conductive with the output terminal of the selecting circuit 230 in the time period p2, is conductive with the output terminal of the selecting circuit 230 in the time period p3, and is not conductive with the output terminal of the selecting circuit 230 in the time period p4. As a result, the drive signal selecting circuit 200 outputs a drive signal VOUT whose voltage forms the trapezoidal waveform Dp11 in the time period p1, is the fixed voltage Vc in the time period p2, forms the trapezoidal waveform Dp31 in the time period p3, and is the fixed voltage Vc in the time period p4. In this case, the large amount of ink and the small amount of ink are ejected from each of the nozzles 651 included in the corresponding ejecting units 600.

When the ejection data [SIH, SIL]=[1, 1], that is, when the latched data [LTa, LTb]=[1, 1] is input to the decoders 226 included in the select signal output units 270, the decoders 226 included in the select signal output units 270 output H-level select signals S in the time period p1, output H-level select signals S in the time period p2, output H-level select signals S in the time period p3, and outputs L-level select signal S in the time period p4. Therefore, each of the corresponding selecting circuits 230 is controlled such that the input terminal of the selecting circuit 230 is conductive with the output terminal of the selecting circuit 230 in the time periods p1, p2, and p3 and is not conductive with the output terminal of the selecting circuit 230 in the time period p4. As a result, the drive signal selecting circuit 200 outputs a drive signal VOUT whose voltage forms the trapezoidal waveform Dp11 in the time period p1, forms the trapezoidal waveform Dp21 in the time period p2, forms the trapezoidal waveform Dp31 in the time period p3, and is the fixed voltage Vc in the time period p4. In this case, the large amount of ink, the middle amount of ink, and the small amount of ink are ejected from each of the nozzles 651 included in the corresponding ejecting units 600.

As described above, in the liquid ejecting apparatus 1 according to the present embodiment, when the operational mode is the multi-gradation mode, each of the ejecting units 600 does not eject ink when the corresponding ejection data [SIH, SIL]=[0, 0], ejects the middle amount of ink when the corresponding ejection data [SIH, SIL]=[0, 1], ejects the large amount of ink and the small amount of ink when the corresponding ejection data [SIH, SIL]=[1, 0], ejects the large amount of ink, the middle amount of ink, and the small amount of ink when the corresponding ejection data [SIH, SIL]=[1, 1]. Therefore, when the ejection data [SIH, SIL]=[0, 0], a dot is not formed. When the ejection data [SIH, SIL]=[0, 1], a dot of a size corresponding to the middle amount of ink is formed on the medium P. When the ejection data [SIH, SIL]=[1, 0], a dot of a size obtained by combining the large amount of ink and the small amount of ink is formed on the medium P. When the ejection data [SIH, SIL]=[1, 1], a dot of a size obtained by combining the large amount of ink, the middle amount of ink, and the small amount of ink is formed on the medium P.

That is, when the operational mode of the liquid ejecting apparatus 1 according to the present embodiment is the multi-gradation mode, dots of four gray levels corresponding to the logic levels of the ejection data [SIH, SIL] are formed on the medium P. Therefore, the liquid ejecting apparatus 1 can form a high-resolution image.

The number of signal waveforms included in the drive signal COM in the multi-gradation mode in each latch cycle Plat, and the number of times that the drive signal selecting circuit 200 controls the ejection of the ink from the ejecting head 21 in each latch cycle Plat are not limited to "4". That is, the number of gray levels of dots to be formed on the medium P in the multi-gradation mode is not limited to "4" and may be appropriately changed according to a request from the user and the use of the liquid ejecting apparatus 1.

4.2 Binary Mode

Next, an example of the operation of the liquid ejecting apparatus 1 when the operation mode of the liquid ejecting apparatus 1 is the binary mode is described.

Figure 14:
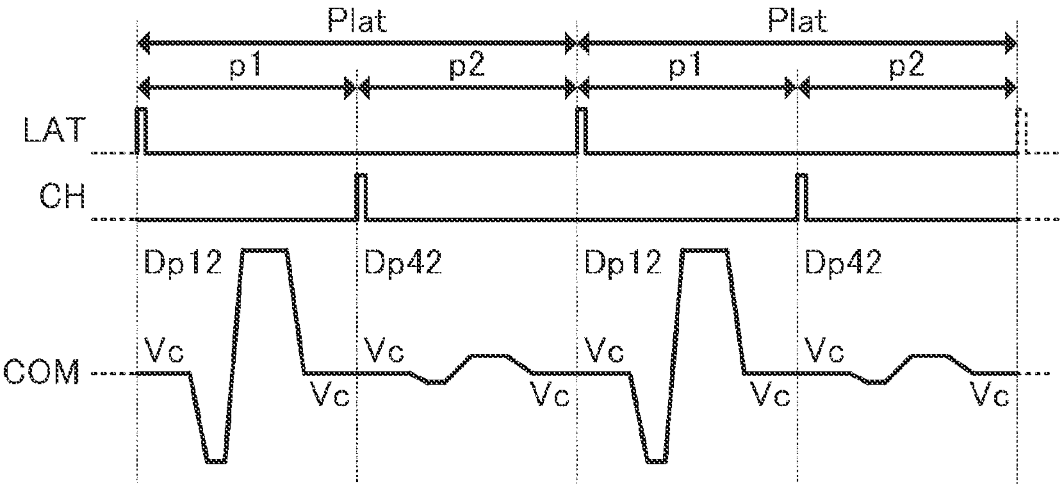
FIG. 14 is a diagram illustrating an example of a signal waveform of the drive signal output by the drive signal output circuit in a binary mode.

FIG. 14 is a diagram illustrating an example of a signal waveform of the drive signal COM output by the drive signal output circuit 52 in the binary mode. As illustrated in FIG. 14, in the binary mode, the drive signal COM has a signal waveform in which a trapezoidal waveform Dp12 set in the time period p1 and a trapezoidal waveform Dp42 set in the time period p2 are continuous.

The trapezoidal waveform Dp12 is a signal waveform that causes a predetermined amount of ink to be ejected from a nozzle 651 corresponding to a piezoelectric element 60 when the trapezoidal waveform Dp12 is supplied to the electrode 611 of the piezoelectric element 60. The trapezoidal waveform Dp42 is a slight vibration waveform that does not cause ink to be ejected from the nozzle 651 corresponding to the piezoelectric element 60 and causes ink in the vicinity of the opening of the nozzle 651 to slightly vibrate when the trapezoidal waveform Dp42 is supplied to the electrode 611 of the piezoelectric element 60.

In the drive signal COM, the trapezoidal waveforms Dp12 and Dp42 start at the voltage Vc and end at the voltage Vc in a similar manner to the trapezoidal waveforms Dp11, Dp21, DP31, and Dp41. That is, the voltage values of the trapezoidal waveforms Dp12 and Dp42 when the trapezoidal waveforms Dp12 and Dp42 start and end are the common voltage Vc.

As illustrated in FIG. 10, in the multi-gradation mode, the drive signal COM includes the four signal waveforms, which are the trapezoidal waveforms Dp11, Dp21, Dp31, and Dp41, in the time periods p1 to p4 defined by the latch signal LAT and the change signal CH. On the other hand, as illustrated in FIG. 14, in the binary mode, the drive signal COM includes the two signal waveforms, which are the trapezoidal waveforms Dp12 and Dp42, in the time periods p1 and p2 defined by the latch signal LAT and the change signal CH. Therefore, the latch cycle Plat in the binary mode can be shorter than the latch cycle Plat in the multi-gradation mode. As a result, it is possible to increase the scanning speed of the carriage 20 on which the ejecting head 21 is mounted. In other words, the frequency of the drive signal COM output by the drive signal output circuit 52 in the binary mode can be higher than the frequency of the drive signal COM output by the drive signal output circuit 52 in the multi-gradation mode. As a result, the speed at which an image is formed on the medium P in the binary mode can be higher than the speed at which an image is formed on the medium P in the multi-gradation mode.

In other words, the liquid ejecting apparatus 1 according to the present embodiment has the binary mode in which the drive signal output circuit 52 outputs, to the ejecting units 600, the drive signal COM of the frequency based on the latch cycle Plat including the two time periods p1 and p2, and the multi-gradation mode in which the drive signal output circuit 52 outputs, to the ejecting units 600, the drive signal COM of the frequency lower than the frequency of the drive signal COM in the binary mode and based on the latch cycle Plat including the four time periods p1 to p4. As a result, it is possible to form a high-resolution image on the medium P in the multi-gradation mode and form an image on the medium P at a high speed in the binary mode.

In the binary mode, the drive signal selecting circuit 200 generates the drive signals VOUT[1] to VOUT[n] by selecting or not selecting each of the trapezoidal waveforms Dp12 and Dp42 included in the drive signal COM based on the head control signal DI in each of the time periods p1 and p2 defined by the latch signal LAT and the change signal CH, and outputs the generated drive signals VOUT[1] to VOUT[n] to the corresponding ejecting units 600[1] to 600[*n*].

Figure 15:
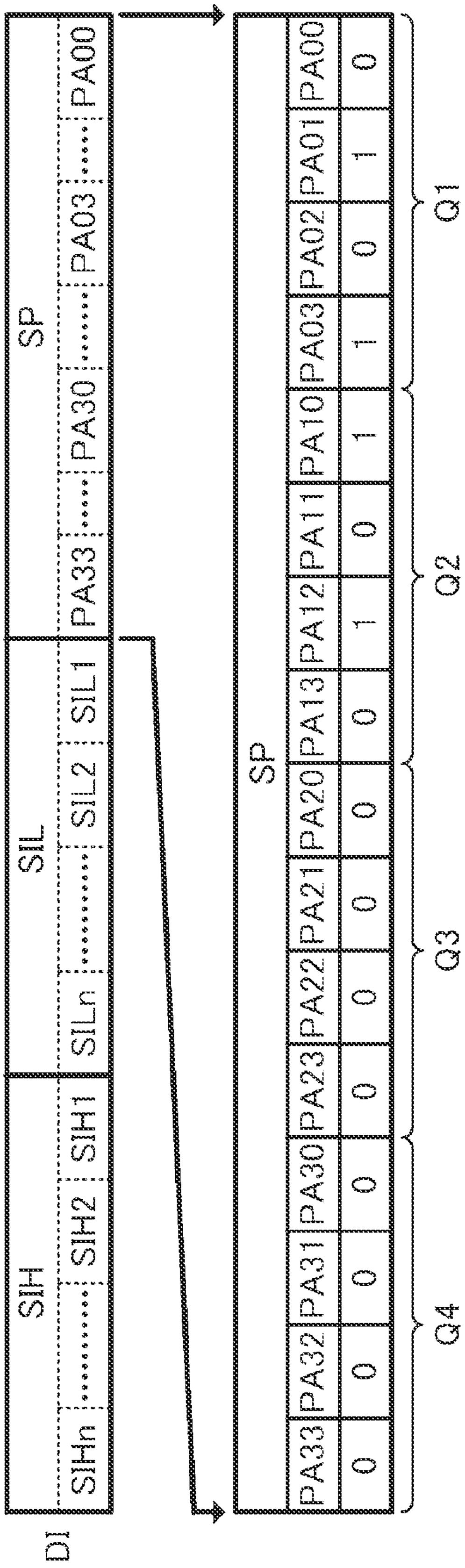
FIG. 15 is a diagram illustrating an example of the head control signal in the binary mode.

FIG. 15 is a diagram illustrating an example of the head control signal DI in the binary mode.

As described above, similarly to the multi-gradation mode, in the binary mode, the ejection control signal SI included in the head control signal DI defines amounts of the ink to be ejected from the nozzles 651 included in the ejecting units 600[1] to 600[*n*]. Therefore, in a time period in which the liquid ejecting apparatus 1 performs the printing control of ejecting the ink on the medium P, the logic level of the ejection control signal SI in the binary mode is appropriately changed according to the amounts of the ink to be ejected from the corresponding nozzles 651.

On the other hand, the setting information signal SP included in the head control signal DI in the binary mode is different from the setting information signal SP included in the head control signal DI in the multi-gradation mode. Specifically, in the binary mode, the setting information signal SP included in the head control signal DI includes, in series, "0" as the setting data PA33, "0" as the setting data PA32, "0" as the setting data PA31, "0" as the setting data PA30, "0" as the setting data PA23, "0" as the setting data PA22, "0" as the setting data PA21, "0" as the setting data PA20, "0" as the setting data PA13, "1" as the setting data PA12, "0" as the setting data PA11, "1" as the setting data PA10, "1" as the setting data PA03, "0" as the setting data PA02, "1" as the setting data PA01, and "0" as the setting data PA00.

That is, in the present embodiment, when the operational mode of the liquid ejecting apparatus 1 is the binary mode, the head control signal DI including the 16-bit setting information signal SP having a logic level "0000, 0000, 0101, 1010" is input to the drive signal selecting circuit 200.

After the setting information signal SP input to the drive signal selecting circuit 200 is held in the SP register group 262, when the latch signal LAT rises, the setting information signal SP is collectively latched by the selection control signal generator 264. Then, the selection control signal generator 264 generates, from the latched setting information signal SP, the setting signal Q1[PA00, PA01, PA02, PA03]=[0, 1, 0, 1], the setting signal Q2[PA10, PA11, PA12, PA13]=[1, 0, 1, 0], the setting signal Q3[PA20, PA21, PA22, PA23]=[0, 0, 0, 0], and the setting signal Q4[PA30, PA31, PA32, PA33]=[0, 0, 0, 0], and outputs the generated setting signals Q1 to Q4 to the decoders 226 included in the select signal output units 270[1] to 270[*n*].

That is, in the binary mode, the setting information signal SP includes the setting data PA00, PA01, PA02, and PA03 corresponding to the setting signal Q1, and the setting data PA10, PA11, PA12, and PA13 corresponding to the setting signal Q2 obtained by inverting the bit data of the setting signal Q1.

As described above, similarly to the multi-gradation mode, even in the binary mode, details of decoding by the decoders 226 included in the select signal output units 270 are defined by the setting signals Q1 to Q4 output by the selection control signal generator 264. FIG. 16 is a diagram illustrating the details of the decoding by the decoders 226 based on the head control signal DI illustrated in FIG. 15. The decoders 226 included in the select signal output units 270 decode the latched data [LTa, LTb] corresponding to the input ejection data [SIH, SIL] based on the details illustrated in FIG. 16 and output select signals S of predetermined logic levels.

For example, the latched data [LTa, LTb]=[1, 0] corresponding to the ejection data [SIH, SIL]=[1, 0] is input to the decoders 226 included in the select signal output units 270, the decoders 226 included in the select signal output units 270 output L-level select signals S in the time period p1, output H-level select signals S in the time period p2, output L-level select signals S in the time period p3, and output L-level select signals S in the time period p4.

Figure 17:
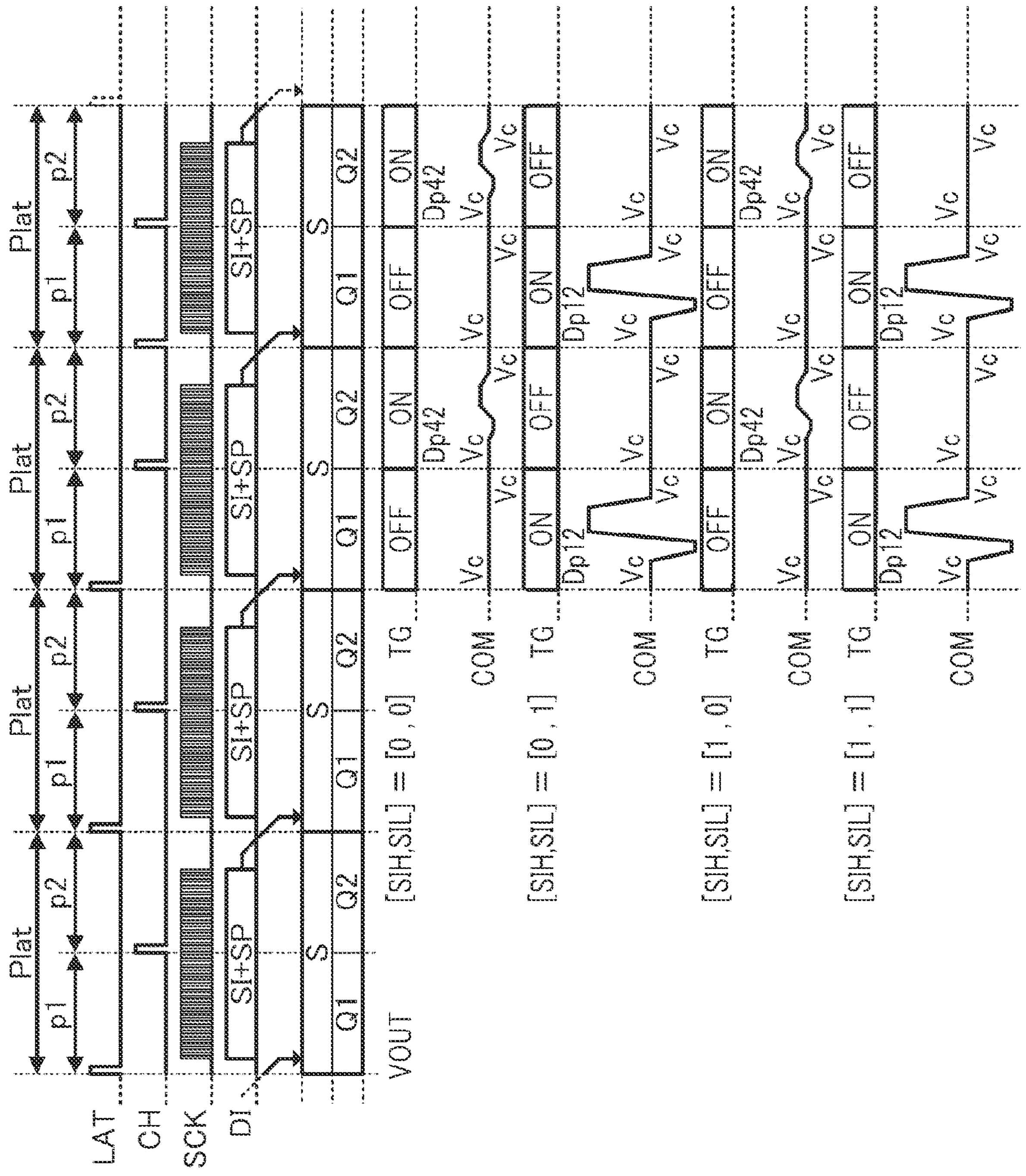
FIG. 17 is a diagram describing an operation of the drive signal selecting circuit in the binary mode.

FIG. 17 is a diagram describing the operation of the drive signal selecting circuit 200 in the binary mode. Similarly to the multi-gradation mode, in the binary mode, the head control signal DI input to the drive signal selecting circuit 200 is synchronized with the clock signal SCK and sequentially transferred to the plurality of registers included in the SP register group 262, the second registers 222*b* included in the select signal output units 270[1] to 270[*n*], and the first registers 222*a* included in the select signal output units 270[1] to 270[*n*].

When the supply of the clock signal SCK is stopped, the setting data PA33 to PA30, PA23 to PA20, PA13 to PA10, and PA03 to PA00 included in the setting information signal SP are held in the plurality of registers included in the SP register group 262, the lower-level ejection data SIL1 to SILn included in the ejection control signal SI are held in the second registers 222*b* included in the select signal output units 270[1] to 270[*n*], and the upper-level ejection data SIH1 to SIHn included in the ejection control signal SI are held in the first registers 222*a* included in the select signal output units 270[1] to 270[*n*].

After that, when the latch signal LAT rises, the setting data PA33 to PA30, PA23 to PA20, PA13 to PA10, and PA03 to PA00 held in the plurality of registers included in the SP register group 262 are simultaneously latched by the selection control signal generator 264, the lower-level ejection data SIL1 to SILn held in the second registers 222*b* included in the select signal output units 270[1] to 270[*n*] are simultaneously latched by the second latch circuits 224*b* included in the select signal output units 270[1] to 270[*n*], and the upper-level ejection data SIH1 to SIHn held in the first registers 222*a* included in the select signal output units 270[1] to 270[*n*] are latched by the first latch circuits 224*a* included in the select signal output units 270[1] to 270[*n*].

The selection control signal generator 264 generates the setting signals Q1 to Q4 from the latched setting data PA33 to PA30, PA23 to PA20, PA13 to PA10, and PA03 to PA00 and outputs the generated setting signals Q1 to Q4 to the decoders 226 included in the select signal output units 270[1] to 270[*n*]. In addition, the second latch circuits 224*b* included in the select signal output units 270[1] to 270[*n*] output the latched lower-level ejection data SIL1 to SILn as latched data LTb1 to LTbn to the corresponding decoders 226, and the first latch circuits 224*a* included in the select signal output units 270[1] to 270[*n*] output the latched upper-level ejection data SIH1 to SIHn as latched data LTa1 to LTan to the corresponding decoders 226.

That is, the setting signals Q1[PA00, PA01, PA02, PA03]=[0, 1, 0, 1], the setting signals Q2[PA10, PA11, PA12, PA13]=[1, 0, 1, 0], the setting signals Q3[PA20, PA21, PA22, PA23]=[0, 0, 0, 0], and the setting signals Q4[PA30, PA31, PA32, PA33]=[0, 0, 0, 0] output by the selection control signal generator 264, and the latched data [LTa, LTb] output by the first and second latch circuits 224*a* and 224*b* included in the select signal output units 270 are input to the decoders 226 included in the select signal output units 270.

The decoders 226 included in the select signal output units 270 decode the input latched data [LTa, LTb] based on the details illustrated in FIG. 16. As a result, the decoders 226 included in the select signal output units 270 output select signals S of predetermined logic levels according to the logic levels of the input latched data [LTa, LTb] and the setting signals Q1 to Q4.

Specifically, when the ejection data [SIH, SIL]=[0, 0], that is, when the latched data [LTa, LTb]=[0, 0] is input to the decoders 226 included in the select signal output units 270, the decoders 226 included in the select signal output units 270 output L-level select signals S in the time period p1 and output L-level select signals S in the time period p2. Therefore, each of the corresponding selecting circuits 230 is controlled such that the input terminal of the selecting circuit 230 is not conductive with the output terminal of the selecting circuit 230 in the time period p1 and is conductive with the output terminal of the selecting circuit 230 in the time period p2. As a result, the drive signal selecting circuit 200 outputs a drive signal VOUT whose voltage is the fixed voltage Vc in the time period p1 and forms the trapezoidal waveform Dp42 in the time period p2. In this case, only ink in the vicinity of the nozzles 651 included in the corresponding ejecting units 600 vibrates, and ink is not ejected from the nozzles 651.

When the ejection data [SIH, SIL]=[0, 1], that is, when the latched data [LTa, LTb]=[0, 1] is input to the decoders 226 included in the select signal output units 270, the decoders 226 included in the select signal output units 270 output H-level select signals S in the time period p1 and output L-level select signals S in the time period p2. Therefore, each of the corresponding selecting circuits 230 is controlled such that the input terminal of the selecting circuit 230 is conductive with the output terminal of the selecting circuit 230 in the time period p1 and is not conductive with the output terminal of the selecting circuit 230 in the time period p2. As a result, the drive signal selecting circuit 200 outputs a drive signal VOUT whose voltage forms the trapezoidal waveform Dp12 in the time period p1 and is the fixed voltage Vc in the time period p2. In this case, the predetermined amount of ink is ejected from each of the nozzles 651 included in the ejecting units 600.

When the ejection data [SIH, SIL]=[1, 0], that is, when the latched data [LTa, LTb]=[1, 0] is input to the decoders 226 included in the select signal output units 270, the decoders 226 included in the select signal output units 270 output L-level select signals S in the time period p1 and output H-level select signals S in the time period p2. Therefore, each of the corresponding selecting circuits 230 is controlled such that the input terminal of the selecting circuit 230 is not conductive with the output terminal of the selecting circuit 230 in the time period p1 and is conductive with the output terminal of the selecting circuit 230 in the time period p2. As a result, the drive signal selecting circuit 200 outputs a drive signal VOUT whose voltage is the fixed voltage Vc in the time period p1 and forms the trapezoidal waveform Dp42 in the time period p2. In this case, only ink in the vicinity of the nozzles 651 included in the ejecting units 600 vibrates and ink is not ejected from the nozzles 651.

When the ejection data [SIH, SIL]=[1, 1], that is, when the latched data [LTa, LTb]=[1, 1] is input to the decoders 226 included in the select signal output units 270, the decoders 226 included in the select signal output units 270 output H-level select signals S in the time period p1 and output L-level select signals S in the time period p2. Therefore, each of the corresponding selecting circuits 230 is controlled such that the input terminal of the selecting circuit 230 is conductive with the output terminal of the selecting circuit 230 in the time period p1 and is not conductive with the output terminal of the selecting circuit 230 in the time period p2. As a result, the drive signal selecting circuit 200 outputs a drive signal VOUT whose voltage forms the trapezoidal waveform Dp12 in the time period p1 and is the fixed voltage Vc in the time period p2. In this case, the predetermined amount of ink is ejected from each of the nozzles 651 included in the corresponding ejecting units 600.

As described above, in the liquid ejecting apparatus 1 according to the present embodiment, when the operational mode is the binary mode, each of the ejecting units 600 does not eject ink when the corresponding ejection data [SIH, SIL]=[0, 0], ejects the predetermined amount of ink when the corresponding ejection data [SIH, SIL]=[0, 1], does not eject ink when the corresponding ejection data [SIH, SIL]=[1, 0], and ejects the predetermined amount of ink when the corresponding ejection data [SIH, SIL]=[1, 1]. Therefore, when the ejection data [SIH, SIL]=[0, 0], and when the ejection data [SIH, SIL]=[1, 0], a dot is not formed on the medium P. When the corresponding ejection data [SIH, SIL]=[0, 1], and when the corresponding ejection data [SIH, SIL]=[1, 1], a dot of a size corresponding to the predetermined amount of ink is formed.

As described above, when the operational mode of the liquid ejecting apparatus 1 according to the present embodiment is the binary mode, the latch cycle Plat can be shorter than the latch cycle Plat in the multi-gradation mode. Therefore, in the binary mode, an image can be formed on the medium P at a high speed.

In the above-described binary mode, it is assumed that the latch cycle Plat is further shortened to form an image on the medium P at a higher speed. However, when the latch cycle Plat is further shortened, the data length of the head control signal DI may be the rate-limiting factor for the speed at which an image is formed on the medium P, and as a result, it may be difficult to further increase the speed at which an image is formed on the medium P. Particularly, the ejection control signal SI included in the head control signal DI defines amounts of the ink to be ejected from the nozzles 651 included in the ejecting units 600[1] to 600[*n*]. Therefore, when the number of nozzles included in the liquid ejecting apparatus 1 is increased, the data length of the ejection control signal SI is increased, and as a result, the possibility that the data length of the head control signal DI may be the rate-limiting factor for the speed at which an image is formed on the medium P may increase.

To avoid this problem, in the liquid ejecting apparatus 1 according to the present embodiment, the setting information signal SP in the binary mode includes the setting data PA00, PA01, PA02, and PA03 corresponding to the setting signal Q1, and the setting data PA10, PA11, PA12, and PA13 corresponding to the setting signal Q2 obtained by inverting the bit data of the setting signal Q1. Therefore, it is possible to reduce the possibility that the data length of the head control signal DI may be the rate-limiting factor for the speed at which an image is formed on the medium P and it is possible to form an image on the medium P at a higher speed.

Specifically, in the liquid ejecting apparatus 1 according to the present embodiment, the setting information signal SP in the binary mode includes the setting data PA00, PA01, PA02, and PA03 corresponding to the setting signal Q1 and the setting data PA10, PA11, PA12, and PA13 corresponding to the setting signal Q2 obtained by inverting the bit data of the setting signal Q1. As illustrated in FIG. 16, in the binary mode, when the latched data [LTa, LTb]=[0, 0] is input to the decoders 226, and when the latched data [LTa, LTb]=[1, 0] is input to the decoders 226, each of the decoders 226 outputs a select signal S of the same logic level in the time periods p1 and p2. In the binary mode, when the latched data [LTa, LTb]=[0, 1] is input to the decoders 226, and when the latched data [LTa, LTb]=[1, 1] is input to the decoders 226, each of the decoders 226 outputs a select signal S of the same logic level in the time periods p1 and p2. That is, when the liquid ejecting apparatus 1 according to the present embodiment is in the binary mode, each of the decoders 226 outputs a select signal S of a predetermined logic level based on only the logic level of the lower-level ejection data SIL.

Figure 18:
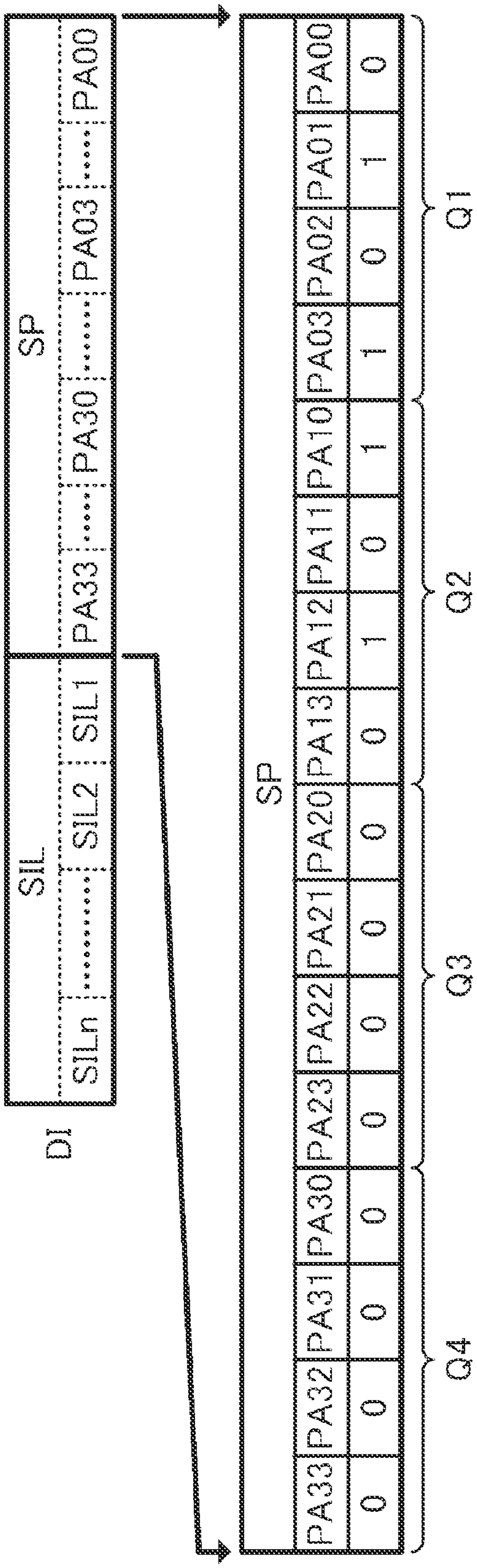
FIG. 18 is a diagram illustrating an example of a data configuration of a head control signal to form an image on a medium at a higher speed in the binary mode.

That is, the logic levels of the upper-level ejection data SIH do not contribute to the logic levels of the select signals S output by the decoders 226. Therefore, in the binary mode, the head control signal DI may not include the upper-level ejection data SIH1 to SIHn. FIG. 18 is a diagram illustrating an example of a data configuration of a head control signal DI to form an image on the medium P at a higher speed in the binary mode.

As illustrated in FIG. 18, an ejection control signal SI included in the head control signal DI to form an image at a higher speed in the binary mode is an n-bit signal including, in series, lower-level ejection data SIL1 corresponding to the ejecting unit 600[1], lower-level ejection data SIL2 corresponding to the ejecting unit 600[2], lower-level ejection data SILn−1 corresponding to the ejecting unit 600[*n*−1], and lower-level ejection data SILn corresponding to the ejecting unit 600[*n*] in the order of the lower-level ejection data SILn, the lower-level ejection data SILn−1, the lower-level ejection data SIL2, and the lower-level ejection data SIL1.

When the head control signal DI is input to the drive signal selecting circuit 200, the head control signal DI is synchronized with the clock signal SCK and transferred to the SP register group 262 and the number n of second registers 222*b* included in the select signal output units 270[1] to 270[*n*] in this order. As a result, when the supply of the clock signal SCK is stopped, setting data PA33 to PA30, PA23 to PA20, PA13 to PA10, and PA03 to PA00 included in a setting information signal SP in the head control signal DI are held in the SP register group 262, the lower-level ejection data SIL corresponding to the ejecting units 600 is held in the second registers 222*b* included in the select signal output units 270, and an indefinite value is held in each of the first registers 222*a* included in the select signal output units 270.

After that, when the latch signal LAT rises, the setting signals Q1 to Q4 output by the selection control signal generator 264, latched data LTa of an indefinite logic level, and latched data LTb corresponding to the lower-level ejection data SIL are input to the decoders 226 included in the select signal output units 270.

In this case, in the liquid ejecting apparatus 1 according to the present embodiment, in the binary mode, each of the decoders 226 included in the select signal output units 270 can output a select signal S of a predetermined logic level based on only the logic level of the lower-level ejection data SIL. Therefore, even when the latched data LTa of an indefinite logic level is input to the decoders 226 included in the select signal output units 270, the decoders 226 can output select signals S of the same logic levels as those when the head control signal DI illustrated in FIG. 15 is input. That is, when the head control signal DI illustrated in FIG. 15 is input to the drive signal selecting circuit 200, and when the head control signal DI illustrated in FIG. 18 is input to the drive signal selecting circuit 200, the selection control circuit 210 outputs select signals S of the same logic levels to the selecting circuits 230[1] to 230[*n*]. As a result, the selecting circuits 230[1] to 230[*n*] output the same drive signals VOUT[1] to VOUT[n] to the corresponding ejecting units 600[1] to 600[*n*]. This can reduce the possibility that the data length of the head control signal DI may be the rate-limiting factor for the speed at which an image is formed on the medium P, and as a result, it is possible to increase the speed at which an image is formed on the medium P in the binary mode.

In other words, the data size of the setting information signal SP in the binary mode is equal to the data size of the setting information signal SP in the multi-gradation mode. Setting the data size of the ejection control signal SI in the binary mode to be smaller than the data size of the ejection control signal SI in the multi-gradation mode makes it possible to reduce the possibility that the data length of the head control signal DI may be the rate-limiting factor for the speed at which an image is formed on the medium P, and to increase the speed at which an image is formed on the medium P.

5 Operations of Temperature Detecting Circuit and Comparing Circuit, and Timing of Determining Abnormal Temperature Next, the detection of the temperature of the drive signal output circuit 52 by the temperature detecting circuit 72, and an operation of the comparing circuit 70 based on the result of detecting the temperature by the temperature detecting circuit 72 are described. In the following description, one end portion of the liquid ejecting apparatus 1 in the main scanning direction may be referred to as one end and the other end portion of the liquid ejecting apparatus 1 in the main scanning direction may be referred to as the other end. A direction from the one end of the liquid ejecting apparatus 1 to the other end of the liquid ejecting apparatus 1 may be referred to as a forward direction. A direction from the other end of the liquid ejecting apparatus 1 to the one end of the liquid ejecting apparatus 1 may be referred to as a backward direction.

Figure 19:
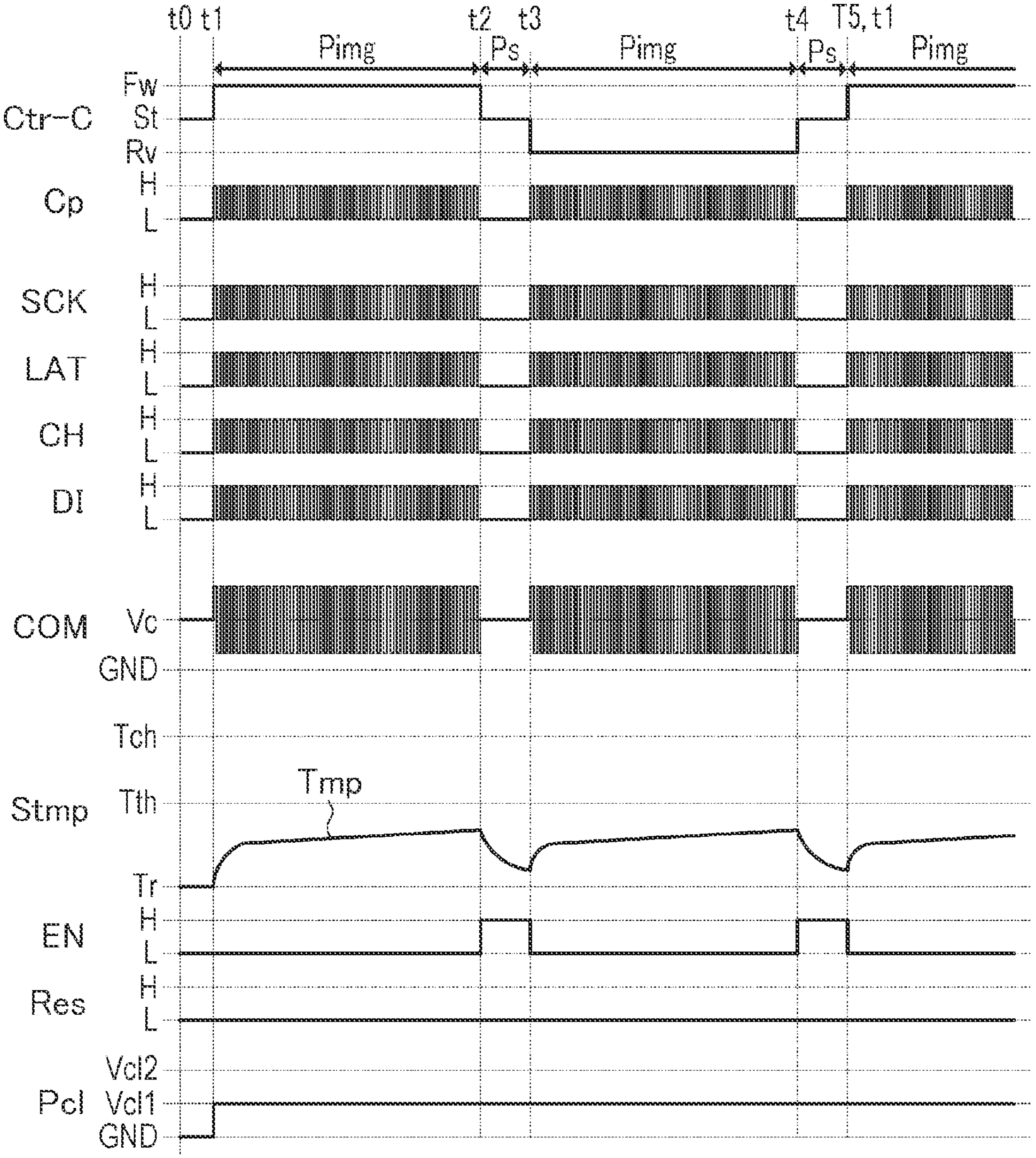
FIG. 19 is a diagram describing an operation of the liquid ejecting apparatus when the temperature of the drive signal output circuit is normal.

First, an operation of the liquid ejecting apparatus 1 when the temperature of the drive signal output circuit 52 is normal is described with reference to FIG. 19. FIG. 19 is a diagram describing the operation of the liquid ejecting apparatus 1 when the temperature of the drive signal output circuit 52 is normal.

As illustrated in FIG. 19, at time to, image data or the like is input to the control circuit 100 included in the liquid ejecting apparatus 1. The control circuit 100 performs image conversion processing to generate, from the input image data, various signals to form an image corresponding to the image data on the medium P.

Thereafter, at time t1, the control circuit 100 outputs a forward direction control signal Fw as the control signal Ctrl-C to move the carriage 20 in the forward direction along the main scanning direction. As a result, the carriage 20 is moved in the forward direction along the main scanning direction. In response to the movement of the carriage 20, the linear encoder 90 generates the positional information signal Cp and outputs the generated positional information signal Cp to the control circuit 100. Then, the control circuit 100 generates the latch signal LAT, the change signal CH, the clock signal SCK, and the head control signal DI based on the input positional information signal Cp and outputs the latch signal LAT, the change signal CH, the clock signal SCK, and the head control signal DI to the ejecting head 21.

In addition, at the time t1, the control circuit 100 outputs a basic drive signal dA to the drive signal output circuit 52. The drive signal output circuit 52 generates a drive signal COM including a signal waveform corresponding to the input basic drive signal dA and outputs the drive signal COM including the signal waveform corresponding to the input basic drive signal dA to the ejecting head 21. In this case, since the drive signal output circuit 52 generates the drive signal COM and outputs the drive signal COM to the ejecting head 21, the temperature of the drive signal output circuit 52 increases. The temperature detecting circuit 72 detects the temperature of the drive signal output circuit 52 as a detected temperature Tmp, generates a temperature information signal Stmp including the detected temperature Tmp, and outputs the temperature information signal Stmp including the detected temperature Tmp to the comparing circuit 70.

In this case, a temperature threshold signal Sth including a threshold temperature Tth and an L-level enable signal EN indicating invalidity are input to the comparing circuit 70. Therefore, the comparing circuit 70 does not compare the threshold temperature Tth with the detected temperature Tmp and outputs, to the control circuit 100, an L-level temperature determination signal Res indicating that the temperature of the drive signal output circuit 52 is normal.

To reduce an increase in the temperature of the drive signal output circuit 52, the power supply circuit 80 outputs cooling power Pcl of a voltage signal Vcl1 to the cooling mechanism 82. The cooling mechanism 82 starts cooling the drive signal output circuit 52 with a cooling capacity according to the voltage value of the voltage signal Vcl1 that indicates the amount of the supplied cooling power Pcl.

At time t2 when the carriage 20 reaches the other end of the liquid ejecting apparatus 1, the control circuit 100 outputs a stop control signal St as the control signal Ctrl-C to stop the movement of the carriage 20 in the main scanning direction. As a result, the carriage 20 is stopped at the other end of the liquid ejecting apparatus 1. In response to the stop of the carriage 20, the linear encoder 90 stops generating the positional information signal Cp, and the control circuit 100 stops generating the latch signal LAT, the change signal CH, the clock signal SCK, and the head control signal DI.

In addition, at the time t2, the control circuit 100 outputs a basic drive signal dA to cause the drive signal output circuit 52 to output a drive signal COM whose voltage is the fixed voltage Vc. As a result, the drive signal output circuit 52 generates the drive signal COM whose voltage value is the fixed voltage Vc, and outputs, to the ejecting head 21, the generated drive signal COM whose voltage value is the fixed voltage Vc.

In this case, the control circuit 100 stops generating the latch signal LAT, the change signal CH, the clock signal SCK, and the head control signal DI, and thus the transfer gates TG included in the selecting circuits 230 of the drive signal selecting circuit 200 are controlled to be non-conductive. As a result, the drive signal COM is not supplied to the electrodes 611 of the piezoelectric elements 60 included in the ejecting units 600. Therefore, power consumption of the drive signal output circuit 52 decreases, and as a result, the temperature of the drive signal output circuit 52 decreases. The temperature detecting circuit 72 detects the temperature of the drive signal output circuit 52 as a detected temperature Tmp, generates a temperature information signal Stmp including the detected temperature Tmp, and outputs the temperature information signal Stmp including the detected temperature Tmp to the comparing circuit 70. In this case, the temperature threshold signal Sth including the threshold temperature Tth and an H-level enable signal EN indicating validity are input to the comparing circuit 70. Therefore, the comparing circuit 70 compares the threshold temperature Tth with the detected temperature Tmp. When the detected temperature Tmp is lower than the threshold temperature Tth, the comparing circuit 70 outputs, to the control circuit 100, an L-level temperature determination signal Res indicating that the temperature of the drive signal output circuit 52 is normal.

At time t3 when a predetermined time period elapses after the carriage 20 is stopped at the other end of the liquid ejecting apparatus 1, the control circuit 100 outputs a backward direction control signal Rv as the control signal Ctrl-C to move the carriage 20 in the backward direction along the main scanning direction. As a result, the carriage 20 is moved in the backward direction along the main scanning direction. In response to the movement of the carriage 20, the linear encoder 90 generates the positional information signal Cp and outputs the generated positional information signal Cp to the control circuit 100. Then, the control circuit 100 generates the latch signal LAT, the change signal CH, the clock signal SCK, and the head control signal DI based on the input positional information signal Cp and outputs the latch signal LAT, the change signal CH, the clock signal SCK, and the head control signal DI to the ejecting head 21.

In addition, at the time t3, the control circuit 100 outputs a basic drive signal dA to the drive signal output circuit 52. The drive signal output circuit 52 generates a drive signal COM including a signal waveform according to the input basic drive signal dA and outputs, to the ejecting head 21, the generated drive signal COM including the signal waveform according to the input basic drive signal dA. In this case, since the drive signal output circuit 52 generates the drive signal COM and outputs the generated drive signal COM to the ejecting head 21, the temperature of the drive signal output circuit 52 increases again. The temperature detecting circuit 72 detects the temperature of the drive signal output circuit 52 as a detected temperature Tmp, generates a temperature information signal Stmp including the detected temperature Tmp, and outputs the temperature information signal Stmp including the detected temperature Tmp to the comparing circuit 70. In this case, the temperature threshold signal Sth including the threshold temperature Tth and the L-level enable signal EN indicating invalidity are input to the comparing circuit 70. Therefore, the comparing circuit 70 does not compare the threshold temperature Tth with the detected temperature Tmp and outputs, to the control circuit 100, the L-level temperature determination signal Res indicating that the temperature of the drive signal output circuit 52 is normal.

At time t4 when the carriage 20 reaches the one end of the liquid ejecting apparatus 1, the control circuit 100 outputs a stop control signal St as the control signal Ctrl-C to stop the movement of the carriage 20 along the main scanning direction. As a result, the carriage 20 is stopped at the one end of the liquid ejecting apparatus 1. In response to the stop of the carriage 20, the linear encoder 90 stops generating the positional information signal Cp, and the control circuit 100 stops generating the latch signal LAT, the change signal CH, the clock signal SCK, and the head control signal DI.

In addition at the time t4, the control circuit 100 outputs a basic drive signal dA to cause the drive signal output circuit 52 to output a drive signal COM whose voltage value is the fixed voltage Vc. As a result, the drive signal output circuit 52 generates the drive signal COM whose voltage value is the fixed voltage Vc, and outputs, to the ejecting head 21, the generated drive signal COM whose voltage value is the fixed voltage Vc.

In this case, since the control circuit 100 stops generating the latch signal LAT, the change signal CH, the clock signal SCK, and the head control signal DI, the transfer gates TG included in the selecting circuits 230 of the drive signal selecting circuit 200 are controlled to be non-conductive. As a result, the drive signal COM is not supplied to the electrodes 611 of the piezoelectric elements 60 included in the ejecting units 600. Therefore, power consumption of the drive signal output circuit 52 decreases, and as a result, the temperature of the drive signal output circuit 52 decreases. The temperature detecting circuit 72 detects the temperature of the drive signal output circuit 52 as a detected temperature Tmp, generates a temperature information signal Stmp including the detected temperature Tmp, and outputs the temperature information signal Stmp including the detected temperature Tmp to the comparing circuit 70. In this case, the temperature threshold signal Sth including the threshold temperature Tth and the H-level enable signal EN indicating validity are input to the comparing circuit 70. Therefore, the comparing circuit 70 compares the threshold temperature Tth with the detected temperature Tmp. When the detected temperature Tmp is lower than the threshold temperature Tth, the comparing circuit 70 outputs, to the control circuit 100, the L-level temperature determination signal Res indicating that the temperature of the drive signal output circuit 52 is normal.

At time t5 when a predetermined time period elapses after the carriage 20 is stopped at the one end of the liquid ejecting apparatus 1, the control circuit 100 outputs the forward direction control signal Fw as the control signal Ctrl-C to move the carriage 20 in the forward direction along the main scanning direction. Then, the control circuit 100 performs the same operation as that performed at the above-described time t1. That is, the time t5 corresponds to the above-described time t1. After the time t5, the same operations as those performed at the time t1 to the time t4 are repeatedly performed. As a result, the ink can be ejected in the entire region of the medium P transported along the transport direction such that a desired image is formed on the medium P.

That is, in a time period from the time t1 to the time t2 and a time period from the time t3 to the time t4, the liquid ejecting apparatus 1 moves the carriage 20 along the main scanning direction and the ejecting head 21 ejects the ink onto the medium P. As a result, the liquid ejecting apparatus 1 forms an image on the medium P in the time period from the time t1 to the time t2 and the time period from the time t3 to the time t4. Each of the time period from the time t1 to the time t2 when the liquid ejecting apparatus 1 forms the image on the medium P and the time period from the time t3 to the time t4 when the liquid ejecting apparatus 1 forms the image on the medium P may be referred to as an image formation period Pimg.

In addition, the liquid ejecting apparatus 1 switches the movement direction of the carriage 20 from the forward direction to the backward direction in a time period from the time t2 to the time t3 and switches the movement direction of the carriage 20 from the backward direction to the forward direction in a time period from the time t4 to the time t5. In this case, the carriage 20 is stopped and the ejecting head 21 does not eject the ink onto the medium P. That is, the liquid ejecting apparatus 1 does not form an image on the medium P in the time period from the time t2 to the time t3 and the time period from the time t4 to the time t5. Each of the time period from the time t2 to the time t3 when the liquid ejecting apparatus 1 does not form an image on the medium P and the time period from the time t4 to the time t5 when the liquid ejecting apparatus 1 does not form an image on the medium P may be referred to as a stop period Ps.

Then, the control circuit 100 outputs the L-level enable signal EN to the comparing circuit 70 in the image formation period Pimg and outputs the H-level enable signal EN to the comparing circuit 70 in the stop period Ps. That is, the comparing circuit 70 compares the threshold temperature Tth with the detected temperature Tmp in the stop period Ps and does not compare the threshold temperature Tth with the detected temperature Tmp in the image formation period Pimg. In other words, the comparing circuit 70 determines whether the temperature of the drive signal output circuit 52 is normal in the stop period Ps, and does not determine whether the temperature of the drive signal output circuit 52 is normal in the image formation period Pimg. As a result, in a time period when the liquid ejecting apparatus 1 performs a printing process, it is possible to reduce the possibility that noise that has occurred due to an operation of the comparing circuit 70 may contribute to the printing process, to improve the quality of an image formed on the medium P, and to reduce power consumption of the liquid ejecting apparatus 1 in a time period for the printing process.

Figure 20:
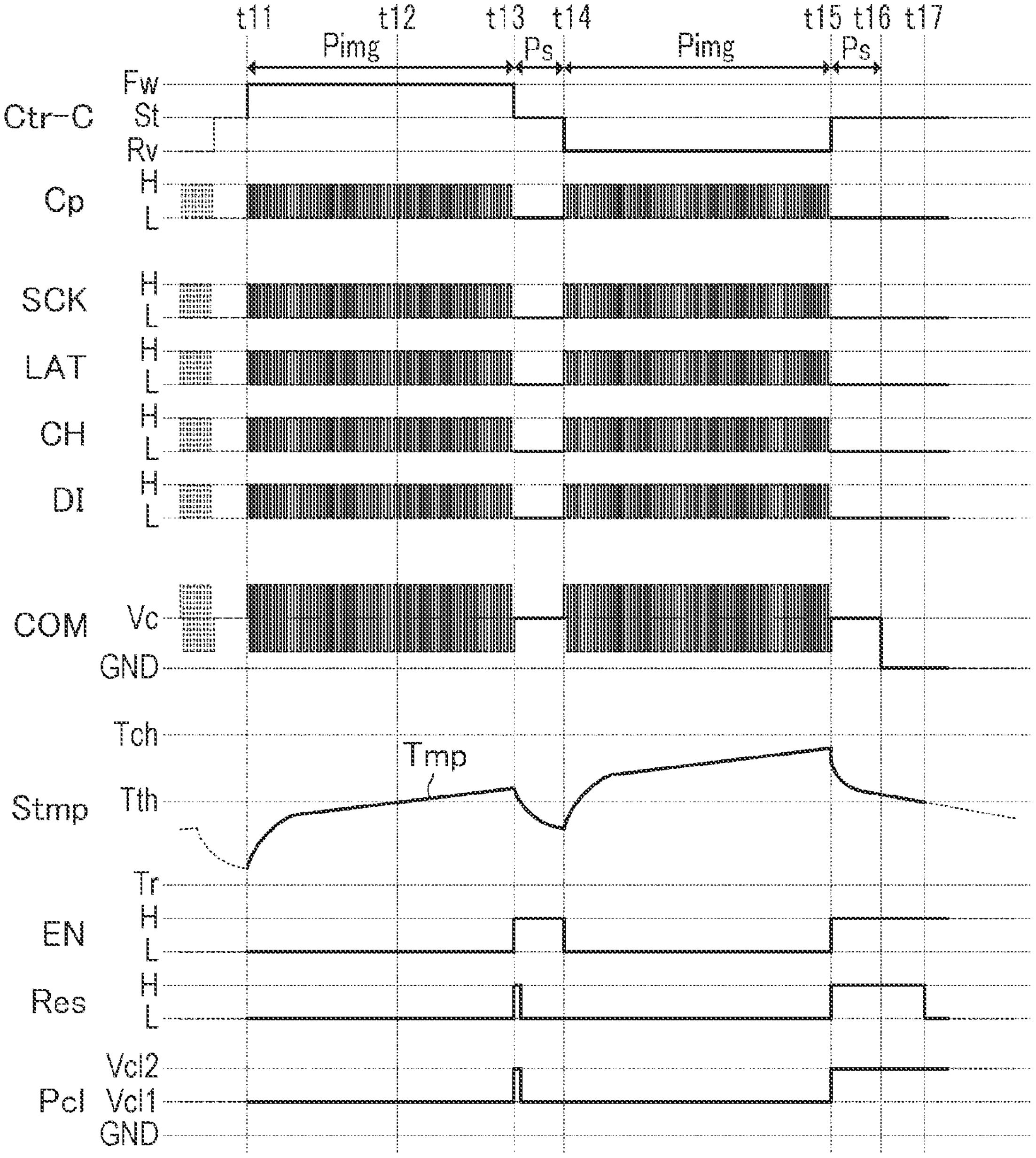
FIG. 20 is a diagram describing an operation of the liquid ejecting apparatus when the temperature of the drive signal output circuit is not normal.

Next, an operation of the liquid ejecting apparatus 1 when the temperature of the drive signal output circuit 52 is not normal is described with reference to FIG. 20. FIG. 20 is a diagram describing the operation of the liquid ejecting apparatus 1 when the temperature of the drive signal output circuit 52 is not normal.

As illustrated in FIG. 20, at time t11, the control circuit 100 outputs the forward direction control signal Fw as the control signal Ctrl-C to move the carriage 20 in the forward direction along the main scanning direction. As a result, the carriage 20 is moved in the forward direction along the main scanning direction and the linear encoder 90 outputs the positional information signal Cp. Then, the control circuit 100 generates the latch signal LAT, the change signal CH, the clock signal SCK, and the head control signal DI based on the positional information signal Cp and outputs the latch signal LAT, the change signal CH, the clock signal SCK, and the head control signal DI to the ejecting head 21.

In addition, at the time t11, the control circuit 100 outputs a basic drive signal dA to the drive signal output circuit 52. The drive signal output circuit 52 generates a drive signal COM according to the input basic drive signal dA and outputs the drive signal COM to the ejecting head 21. Since the drive signal output circuit 52 generates the drive signal COM and outputs the drive signal COM to the ejecting head 21, the temperature of the drive signal output circuit 52 increases. In this case, the temperature of the drive signal output circuit 52 is higher than the temperature of the drive signal output circuit 52 in a normal state.

The temperature detecting circuit 72 detects the temperature of the drive signal output circuit 52 as a detected temperature Tmp, generates a temperature information signal Stmp including the detected temperature Tmp, and outputs the temperature information signal Stmp including the detected temperature Tmp to the comparing circuit 70. In this case, the temperature threshold signal Sth including the threshold temperature Tth and the L-level enable signal EN indicating invalidity are input to the comparing circuit 70. Therefore, the comparing circuit 70 does not compare the threshold temperature Tth with the detected temperature Tmp and outputs, to the control circuit 100, the L-level temperature determination signal Res indicating that the temperature of the drive signal output circuit 52 is normal. In addition, since the L-level enable signal EN indicating invalidity is input to the comparing circuit 70, as indicated by time t12, even when the detected temperature Tmp input to the comparing circuit 70 is higher than the threshold temperature Tth, the comparing circuit 70 continues to output the L-level temperature determination signal Res indicating that the temperature of the drive signal output circuit 52 is normal.

At time t13 when the carriage 20 reaches the other end of the liquid ejecting apparatus 1, the control circuit 100 outputs the stop control signal St as the control signal Ctrl-C to stop the movement of the carriage 20 along the main scanning direction. As a result, the carriage 20 is stopped at the other end of the liquid ejecting apparatus 1. In response to the stop of the carriage 20, the linear encoder 90 stops generating the positional information signal Cp and the control circuit 100 stops generating the latch signal LAT, the change signal CH, the clock signal SCK, and the head control signal DI.

In addition, at the time t13, the control circuit 100 outputs a basic drive signal dA to cause the drive signal output circuit 52 to output a drive signal COM whose voltage value is the fixed voltage Vc. As a result, the drive signal output circuit 52 generates the drive signal COM whose voltage value is the fixed voltage Vc, and outputs, to the ejecting head 21, the generated drive signal COM whose voltage value is the fixed voltage Vc. In this case, the control circuit 100 stops generating the latch signal LAT, the change signal CH, the clock signal SCK, and the head control signal DI. Therefore, the transfer gates TG included in the selecting circuits 230 of the drive signal selecting circuit 200 are controlled to be non-conductive. Therefore, the drive signal COM is not supplied to the electrodes 611 of the piezoelectric elements 60 included in the ejecting units 600.

In this case, the temperature threshold signal Sth including the threshold temperature Tth and the H-level enable signal EN indicating validity are input to the comparing circuit 70. Therefore, the comparing circuit 70 compares the threshold temperature Tth with the detected temperature Tmp. Since the detected temperature Tmp is higher than the threshold temperature Tth, the comparing circuit 70 outputs, to the control circuit 100, the H-level temperature determination signal Res indicating that the temperature of the drive signal output circuit 52 is not normal. In this case, the power supply circuit 80 outputs, to the cooling mechanism 80, cooling power Pcl of a voltage signal Vcl2 having a voltage value larger than that of the voltage signal Vcl1. That is, the cooling mechanism 82 cools the drive signal output circuit 52 with a higher cooling capacity. In other words, when the detected temperature Tmp indicating the result of detecting the temperature of the drive signal output circuit 52 by the temperature detecting circuit 72 is higher than the threshold temperature Tth, the power supply circuit 80 increases the amount of cooling power Pcl to be supplied to the cooling mechanism 82. Therefore, it is possible to improve the efficiency of cooling the drive signal output circuit 52 whose temperature is abnormal.

At the time t13, the control circuit 100 stops generating the latch signal LAT, the change signal CH, the clock signal SCK, and the head control signal DI, and thus the transfer gates TG included in the selecting circuits 230 of the drive signal selecting circuit 200 are controlled to be non-conductive. As a result, the drive signal COM is not supplied to the electrodes 611 of the piezoelectric elements 60 included in the ejecting units 600. Therefore, power consumption of the drive signal output circuit 52 decreases and as a result, the temperature of the drive signal output circuit 52 decreases.

Then, when the detected temperature Tmp included in the input temperature information signal Stmp becomes lower than the threshold temperature Tth as a result of the decrease in the temperature of the drive signal output circuit 52, the comparing circuit 70 outputs, to the control circuit 100, the L-level temperature determination signal Res indicating that the temperature of the drive signal output circuit 52 is normal.

In this case, the power supply circuit 80 outputs the cooling power Pcl of the voltage signal Vcl1 to the cooling mechanism 82. Therefore, power consumption of the cooling mechanism 82 is reduced.

At time t14 when a predetermined time period elapses after the carriage 20 is stopped at the other end of the liquid ejecting apparatus 1, when the comparing circuit 70 outputs the L-level temperature determination signal Res indicating that the temperature of the drive signal output circuit 52 is normal, the control circuit 100 outputs the backward direction control signal Rv as the control signal Ctrl-C to move the carriage 20 in the backward direction along the main scanning direction. Therefore, the carriage 20 is moved in the backward direction along the main scanning direction. In response to the movement of the carriage 20, the linear encoder 90 generates the positional information signal Cp and outputs the generated positional information signal Cp to the control circuit 100. Then, the control circuit 100 generates the latch signal LAT, the change signal CH, the clock signal SCK, and the head control signal DI based on the input positional information signal Cp and outputs the latch signal LAT, the change signal CH, the clock signal SCK, and the head control signal DI to the ejecting head 21.

In addition, at the time t14, the control circuit 100 outputs a basic drive signal dA to the drive signal output circuit 52. The drive signal output circuit 52 generates a drive signal COM including a signal waveform according to the input basic drive signal dA and outputs, to the ejecting head 21, the generated drive signal COM including the signal waveform according to the input basic drive signal dA. In this case, since the drive signal output circuit 52 generates the drive signal COM and outputs the drive signal COM to the ejecting head 21, the temperature of the drive signal output circuit 52 increases again. The temperature detecting circuit 72 detects the temperature of the drive signal output circuit 52 as a detected temperature Tmp, generates a temperature information signal Stmp including the detected temperature Tmp, and outputs the temperature information signal Stmp including the detected temperature Tmp to the comparing circuit 70. In this case, the temperature threshold signal Sth including the threshold temperature Tth and the L-level enable signal EN indicating invalidity are input to the comparing circuit 70. Therefore, the comparing circuit 70 does not compare the threshold temperature Tth with the detected temperature Tmp and outputs, to the control circuit 100, the L-level temperature determination signal Res indicating that the temperature of the drive signal output circuit 52 is normal.

At time t15 when the carriage 20 reaches the one end of the liquid ejecting apparatus 1, the control circuit 100 outputs the stop control signal St as the control signal Ctrl-C to stop the movement of the carriage 20 along the main scanning direction. That is, the carriage 20 is stopped at the other end of the liquid ejecting apparatus 1. In response to the stop of the carriage 20, the linear encoder 90 stops generating the positional information signal Cp and the control circuit 100 stops generating the latch signal LAT, the change signal CH, the clock signal SCK, and the head control signal DI.

In addition, at the time t15, the control circuit 100 outputs a basic drive signal dA to cause the drive signal output circuit 52 to output a drive signal COM whose voltage value is the fixed voltage Vc. As a result, the drive signal output circuit 52 generates the drive signal COM whose voltage value is the fixed voltage Vc, and outputs, to the ejecting head 21, the generated drive signal COM whose voltage value is the fixed voltage Vc. In this case, the control circuit 100 stops generating the latch signal LAT, the change signal CH, the clock signal SCK, and the head control signal DI. Therefore, the transfer gates TG included in the selecting circuits 230 of the drive signal selecting circuit 200 are controlled to be non-conductive. As a result, the drive signal COM is not supplied to the electrodes 611 of the piezoelectric elements 60 included in the ejecting units 600.

In this case, the temperature threshold signal Sth including the threshold temperature Tth and the H-level enable signal EN indicating validity are input to the comparing circuit 70. Therefore, the comparing circuit 70 compares the threshold temperature Tth with the detected temperature Tmp. Since the detected temperature Tmp is higher than the threshold temperature Tth, the comparing circuit 70 outputs, to the control circuit 100, the H-level temperature determination signal Res indicating that the temperature of the drive signal output circuit 52 is not normal. In this case, the power supply circuit 80 outputs, to the cooling mechanism 82, cooling power Pcl of the voltage signal Vcl2 having a voltage value larger than that of the voltage signal Vcl1. That is, the cooling mechanism 82 cools the drive signal output circuit 52 with a higher cooling capacity. In other words, when the detected temperature Tmp indicating the result of detecting the temperature of the drive signal output circuit 52 by the temperature detecting circuit 72 is higher than the threshold temperature Tth, the power supply circuit 80 increases the amount of cooling power Pcl to be supplied to the cooling mechanism 82. Therefore, it is possible to improve the efficiency of cooling the drive signal output circuit 52 whose temperature is abnormal.

In addition, at the time t15, the control circuit 100 stops generating the latch signal LAT, the change signal CH, the clock signal SCK, and the head control signal DI, and thus the transfer gates TG included in the selecting circuits 230 of the drive signal selecting circuit 200 are controlled to be non-conductive. As a result, the drive signal COM is not supplied to the electrodes 611 of the piezoelectric elements 60 included in the ejecting units 600. Therefore, power consumption of the drive signal output circuit 52 decreases and as a result, the temperature of the drive signal output circuit 52 decreases.

At time t16 when a predetermined time period elapses after the carriage 20 is stopped at the one end of the liquid ejecting apparatus 1, when the comparing circuit 70 outputs, to the control circuit 100, the H-level temperature determination signal Res indicating that the temperature of the drive signal output circuit 52 is not normal, the control circuit 100 causes the drive signal output circuit 52 to stop outputting. To cause the drive signal output circuit 52 to stop outputting, for example, the control circuit 100 may generate a basic drive signal dA for a drive signal COM at a ground potential and supply the generated basic drive signal dA to the drive signal output circuit 52, or may stop outputting the basic drive signal dA to the drive signal output circuit 52. That is, when the detected temperature Tmp indicating the result of detecting the temperature of the drive signal output circuit 52 by the temperature detecting circuit 72 is higher than the threshold temperature Tth, the drive signal output circuit 52 stops outputting the drive signal COM.

In addition, at the time t16, when the comparing circuit 70 outputs, to the control circuit 100, the H-level temperature determination signal Res indicating that the temperature of the drive signal output circuit 52 is not normal, the control circuit 100 may continue to output the stop control signal St as the control signal Ctrl-C to stop the movement of the carriage 20 along the main scanning direction and may continue to stop generating the latch signal LAT, the change signal CH, the clock signal SCK, and the head control signal DI. That is, when the detected temperature Tmp indicating that the result of detecting the temperature of the drive signal output circuit 52 by the temperature detecting circuit 72 is higher than the threshold temperature Tth, the liquid ejecting apparatus 1 may stop forming an image on the medium P.

Thereafter, at time t17, the temperature of the drive signal output circuit 52 decreases and the comparing circuit 70 outputs, to the control circuit 100, the L-level temperature determination signal Res indicating that the temperature of the drive signal output circuit 52 is normal. In this case, the control circuit 100 may continuously operate in a state in which operations of the units of the liquid ejecting apparatus 1 including the drive signal output circuit 52 are stopped. In addition, after a predetermined time period elapses after the time t17, the operations of the units of the liquid ejecting apparatus 1 including the drive signal output circuit 52 may be started. Furthermore, after a predetermined time period elapses after the L-level temperature determination signal Res is input to the control circuit 100, the control circuit 100 may start the operations of the units of the liquid ejecting apparatus 1 including the drive signal output circuit 52. After that, when the H-level temperature determination signal Res is input to the control circuit 100 again, the control circuit 100 may continuously operate in a state in which the operations of the units of the liquid ejecting apparatus 1 including the drive signal output circuit 52 are stopped.

As described above, in the liquid ejecting apparatus 1 according to the present embodiment, the comparing circuit 70 does not compare the threshold temperature Tth with the detected temperature Tmp in the image formation period Pimg and compares the threshold temperature Tth with the detected temperature Tmp in the stop period Ps so as to reduce power consumption of the liquid ejecting apparatus 1. Therefore, when the threshold temperature Tth is to be compared with the detected temperature Tmp in the stop period Ps, the liquid ejecting apparatus 1 estimates the value of an increase in the temperature of the drive signal output circuit 52 in the image formation period Pimg, and determines whether the temperature of the drive signal output circuit 52 is normal. Therefore, even when the temperature of the drive signal output circuit 52 increases in the image formation period Pimg, the threshold temperature Tth for determining whether the temperature of the drive signal output circuit 52 is normal is set such that the temperature of the drive signal output circuit 52 does not reach a maximum threshold temperature Tch at which the drive signal output circuit 52 may fail.

However, a driving state of the liquid ejecting apparatus 1 according to the present embodiment in the multi-gradation mode for forming a high-quality image on the medium P is different from a driving state of the liquid ejecting apparatus 1 in the binary mode for forming an image on the medium P at a high speed. Therefore, in the image formation period Pimp, the value of an increase in the temperature of the drive signal output circuit 52 in the multi-gradation mode is different from the value of an increase in the temperature of the drive signal output circuit 52 in the binary mode. When the threshold temperature Tth is set based on the value of an increase in the temperature of the drive signal output circuit 52 in the operational mode in which an increase in the temperature is smaller in the image formation period Pimg, and the liquid ejecting apparatus 1 operates in the operational mode in which an increase in the temperature is larger, the temperature of the drive signal output circuit 52 may reach the maximum threshold temperature Tch. On the other hand, when the threshold temperature Tth is set based on the value of an increase in the temperature of the drive signal output circuit 52 in the operational mode in which an increase in the temperature is larger in the image formation period Pimg, and the liquid ejecting apparatus 1 operates in the operational mode in which an increase in the temperature is smaller, the temperature of the drive signal output circuit 52 may become excessively lower than the maximum threshold temperature Tch and the liquid ejecting apparatus 1 may have an excessive specification.

Figures 21A, 21B:
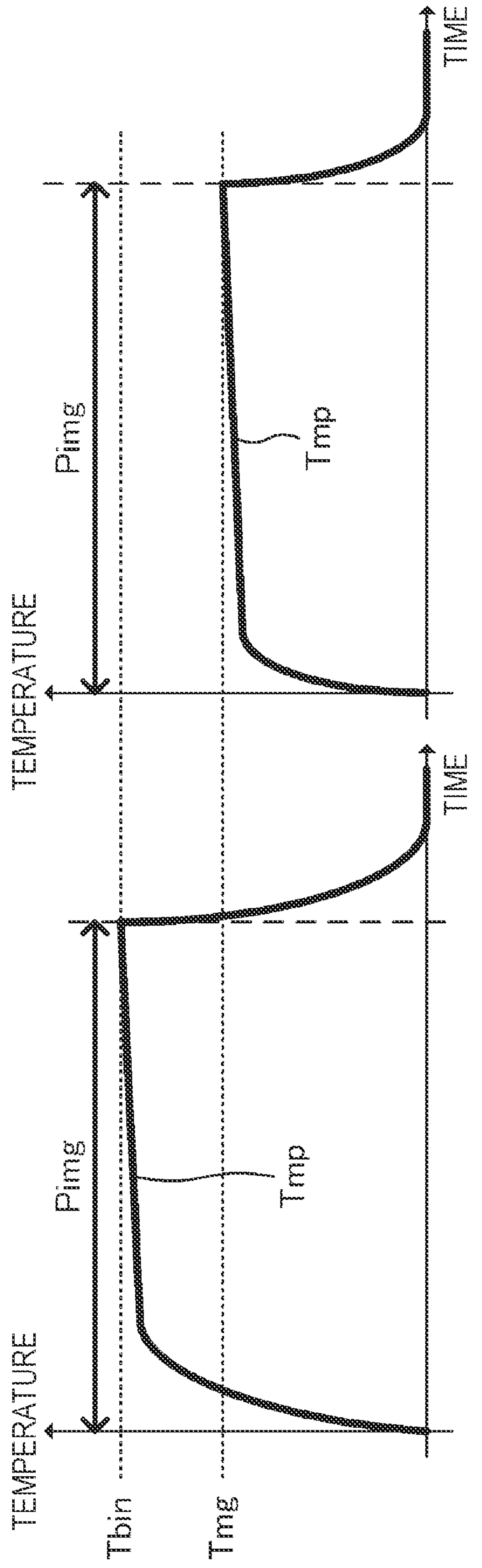
FIGS. 21A and 21B are diagrams schematically illustrating the comparison of the value of an increase in the temperature of the drive signal output circuit in the binary mode with the value of an increase in the temperature of the drive signal output circuit in the multi-gradation mode.

The liquid ejecting apparatus 1 according to the present embodiment has a characteristic configuration that reduces the possibility that the problems may occur. Before the characteristic configuration is described, the difference between an increase in the temperature of the drive signal output circuit 52 in the multi-gradation mode and an increase in the temperature of the drive signal output circuit 52 in the binary mode is described. FIGS. 21A and 21B are diagrams schematically illustrating the comparison of the value of an increase in the temperature of the drive signal output circuit 52 in the binary mode with the value of an increase in the temperature of the drive signal output circuit 52 in the multi-gradation mode. FIG. 21A illustrates the "value of the increase in the temperature of the drive signal output circuit 52 in the binary mode" and FIG. 21B illustrates the "value of the increase in the temperature of the drive signal output circuit 52 in the multi-gradation mode".

As illustrated in FIG. 21A, the value of the increase in the temperature of the drive signal output circuit 52 in the image formation period Pimg when the liquid ejecting apparatus 1 is driven in the binary mode is an increasing temperature Tbin. On the other hand, as illustrated in FIG. 21B, the value of the increase in the temperature of the drive signal output circuit 52 in the image formation period Pimg when the liquid ejecting apparatus 1 is driven in the multi-gradation mode is an increasing temperature Tmg that is lower than the increasing temperature Tbin. That is, the value of the increase in the temperature in the image formation period Pimg when the liquid ejecting apparatus 1 is driven in the binary mode is larger than the value of the increase in the temperature in the image formation period Pimg when the liquid ejecting apparatus 1 is driven in the multi-gradation mode.

To increase the speed at which an image is formed on the medium P in the binary mode, the latch cycle Plat in the binary mode is set to be shorter than the latch cycle Plat in the multi-gradation mode. Therefore, the frequency of the drive signal COM in the binary mode is shorter than the frequency of the drive signal COM in the multi-gradation mode, and the amount of a current per unit of time generated for the transfer of the drive signal COM output by the drive signal output circuit 52 in the binary mode is larger than the amount of a current per unit of time generated for the transfer of the drive signal COM output by the drive signal output circuit 52 in the multi-gradation mode. As a result, as illustrated in FIGS. 21A and 21B, the increasing temperature Tbin that is the value of the increase in the temperature in the image formation period Pimg when the liquid ejecting apparatus 1 operates in the binary mode is larger than the increasing temperature Tmg that is the value of the increase in the temperature in the image formation period Pimg when the liquid ejecting apparatus 1 operates in the multi-gradation mode.

In the liquid ejecting apparatus 1 according to the present embodiment, the control circuit 100 controls the power supply circuit 80 using the power control signal Spsy such that the amount of cooling power Pcl supplied by the power supply circuit 80 to the cooling mechanism 82 in the binary mode is larger than the amount of cooling power Pcl supplied by the power supply circuit 80 to the cooling mechanism 82 in the multi-gradation mode. That is, the liquid ejecting apparatus 1 according to the present embodiment has a configuration in which the amount of power supplied by the power supply circuit 80 to the cooling mechanism 82 in the binary mode is larger than the amount of power by the power supply circuit 80 to the cooling mechanism 82 in the multi-gradation mode.

Figures 22A, 22B:
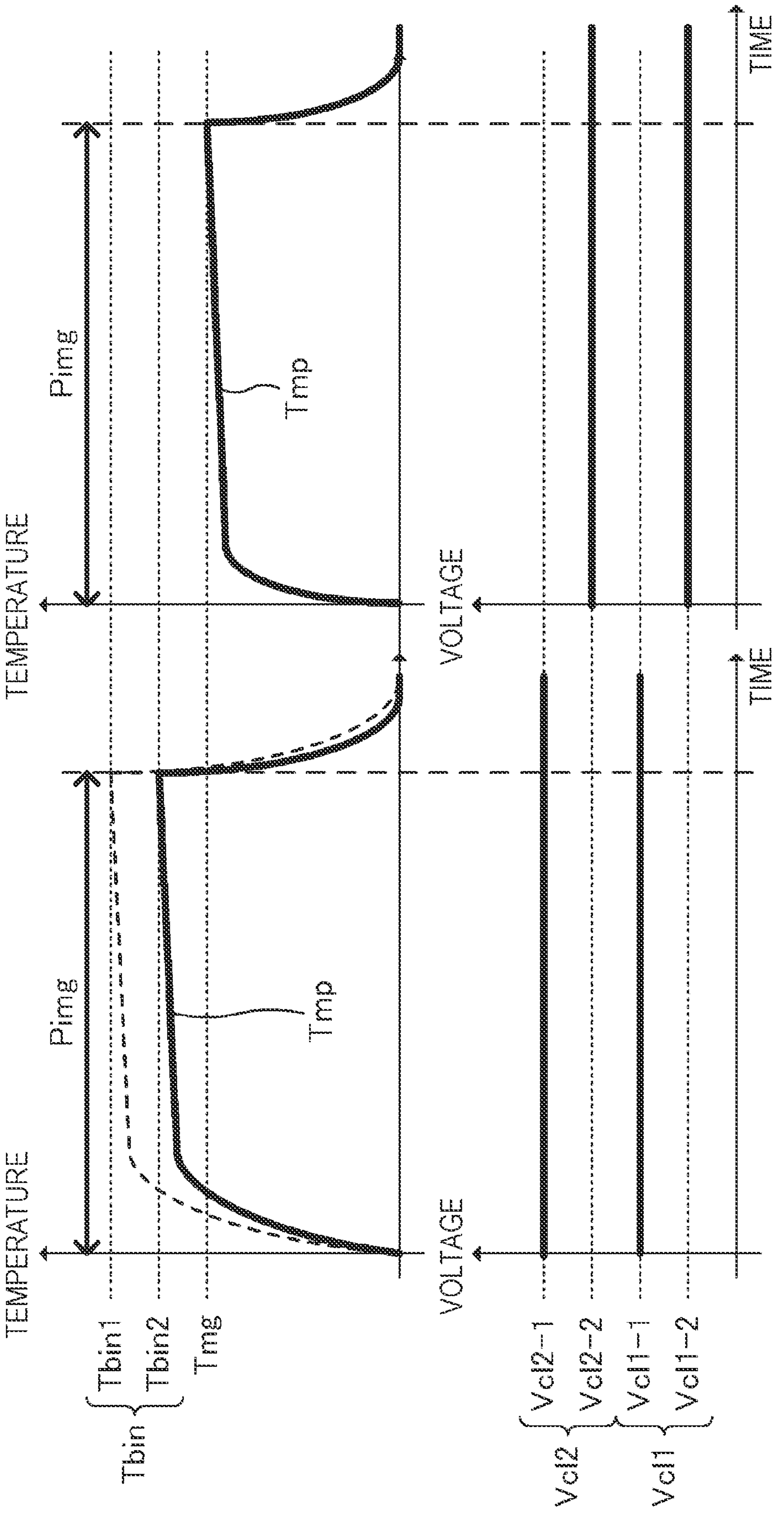
FIGS. 22A and 22B are diagrams schematically illustrating relationships between cooling power supplied by a power supply circuit to a cooling mechanism, the value of an increase in the temperature of the drive signal output circuit in the binary mode, and the value of an increase in the temperature of the drive signal output circuit in the multi-gradation mode.

FIGS. 22A and 22B are diagrams schematically illustrating relationships between cooling power Pcl supplied by the power supply circuit 80 to the cooling mechanism 82, the value of an increase in the temperature of the drive signal output circuit 52 in the binary mode, and the value of an increase in the temperature of the drive signal output circuit 52 in the multi-gradation mode. FIG. 22A illustrates "the relationship between the cooling power Pcl and the value of the increase in the temperature of the drive signal output circuit 52 in the binary mode", and FIG. 22B illustrates "the relationship between the cooling power Pcl and the value of the increase in the temperature of the drive signal output circuit 52 in the multi-gradation mode".

As illustrated in FIGS. 22A and 22B, when the liquid ejecting apparatus 1 operates in the binary mode, the control circuit 100 outputs, to the power supply circuit 80, a power control signal Spsy to set the voltage value of the voltage signal Vcl1 for the cooling power Pcl supplied by the power supply circuit 80 to a voltage Vcl1-1. When the liquid ejecting apparatus 1 operates in the multi-gradation mode, the control circuit 100 outputs, to the power supply circuit 80, a power control signal Spsy to set the voltage value of the voltage signal Vcl1 for the cooling power Pcl output by the power supply circuit 80 to a voltage Vcl1-2 lower than the voltage Vcl1-1.

Therefore, the cooling capacity of the cooling mechanism 82 to cool the drive signal output circuit 52 in the binary mode is higher than the cooling capacity of the cooling mechanism 82 to cool the drive signal output circuit 52 in the multi-gradation mode. As a result, in the binary mode, it is possible to reduce the value of an increase in the temperature of the drive signal output circuit 52.

Specifically, the increasing temperature Tbin that is the value of an increase in the temperature in the image formation period Pimg when the liquid ejecting apparatus 1 is driven in the binary mode decreases from an increasing temperature Tbin1 to an increasing temperature Tbin2. As a result, it is possible to reduce a temperature difference between the increasing temperature Tbin that is the value of the increase in the temperature in the image formation period Pimg when the liquid ejecting apparatus 1 is driven in the binary mode and the increasing temperature Tmg that is the value of the increase in the temperature in the image formation period Pimg when the liquid ejecting apparatus 1 is driven in the multi-gradation mode.

As a result, when the threshold temperature Tth is set based on the increasing temperature Tmg of the drive signal output circuit 52 in the image formation period Pimg when the liquid ejecting apparatus 1 operates in the multi-gradation mode in which an increase in the temperature is smaller, the temperature difference between the increasing temperature Tbin and the increasing temperature Tmg is small and thus the possibility that the temperature of the drive signal output circuit 52 may reach the maximum threshold temperature Tch is reduced even when the liquid ejecting temperature 1 operates in the binary mode in which an increase in the temperature is larger.

In addition, when the threshold temperature Tth is set based on the increasing temperature Tbin of the drive signal output circuit 52 in the image formation period Pimg when the liquid ejecting apparatus 1 operates in the binary mode in which an increase in the temperature is larger, the temperature difference between the increasing temperature Tbin and the increasing temperature Tmg is small and thus the possibility that the temperature of the drive signal output circuit 52 may be excessively lower than the maximum threshold temperature Tch is reduced even when the liquid ejecting temperature 1 operates in the multi-gradation mode in which an increase in the temperature is smaller.

When the liquid ejecting apparatus 1 operates in the binary mode, the control circuit 100 may output, to the power supply circuit 80, a power control signal Spsy to set the voltage value of the voltage signal Vcl2 for the cooling power Pcl output by the power supply circuit 80 to a voltage Vcl2-1. When the liquid ejecting apparatus 1 operates in the multi-gradation mode, the control circuit 100 may output, to the power supply circuit 80, a power control signal Spsy to set the voltage value of the voltage signal Vcl2 for the cooling power Pcl output by the power supply circuit 80 to a voltage Vcl2-2 lower than the voltage Vcl2-1.

In addition, in the liquid ejecting apparatus 1 according to the present embodiment, the control circuit 100 has a configuration in which the threshold temperature Tth included in the temperature threshold signal Sth input to the comparing circuit 70 in the binary mode is lower than the threshold temperature Tth included in the temperature threshold signal Sth input to the comparing circuit 70 in the multi-gradation mode. That is, the liquid ejecting apparatus 1 according to the present embodiment has a configuration in which a threshold temperature Tth1 in the binary mode is lower than a threshold temperature Tth2 in the multi-gradation mode.

Figures 23A, 23B:
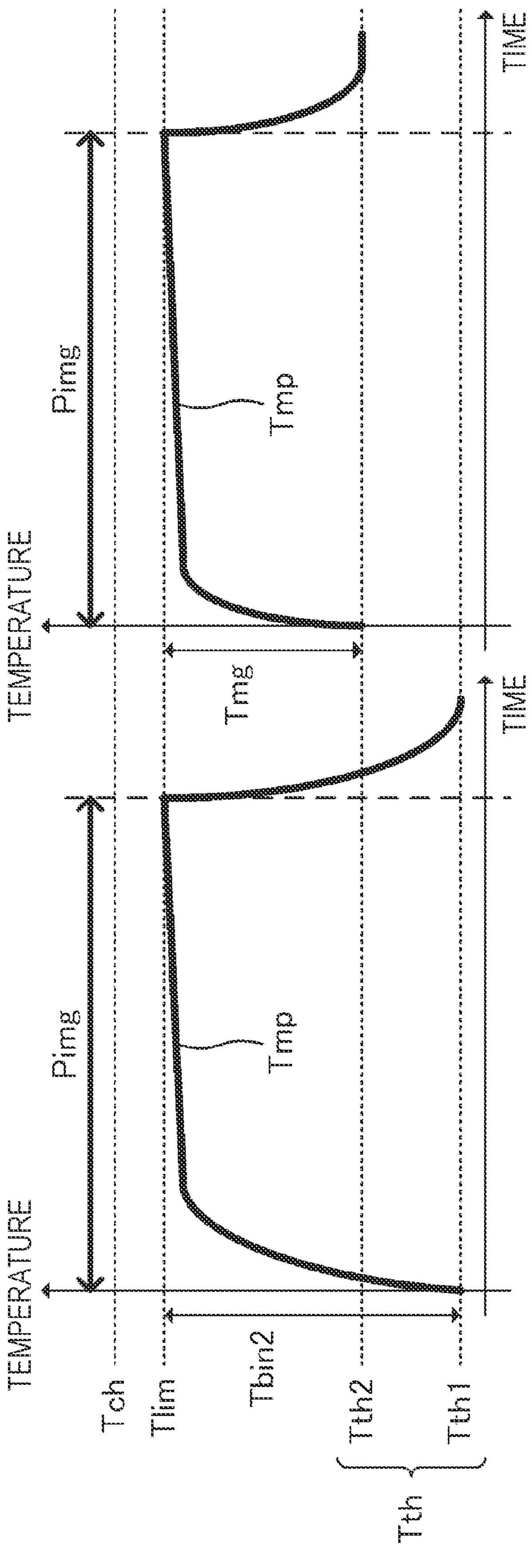
FIGS. 23A and 23B are diagrams schematically illustrating an example of a threshold temperature suitable for the binary mode and a threshold temperature suitable for the multi-gradation mode.

FIGS. 23A and 23B are diagrams schematically illustrating an example of the threshold temperature Tth1 suitable for the binary mode and the threshold temperature Tth2 suitable for the multi-gradation mode. FIG. 23A illustrates "the threshold temperature Tth1 suitable for the binary mode" and FIG. 23B illustrates "the threshold temperature Tth2 suitable for the multi-gradation mode".

As illustrated in FIGS. 23A and 23B, of the threshold temperatures Tth, the threshold temperature Tth1 suitable for the binary mode can be defined by subtracting, from a maximum set temperature Tlim obtained by adding a certain margin to the maximum threshold temperature Tch at which a failure may be likely to occur in the drive signal output circuit 52, the increasing temperature Tbin2 that is the value of an increase in the temperature of the drive signal output circuit 52 in the image formation period Pimg when the liquid ejecting apparatus 1 is driven in the binary mode.

In addition, of the threshold temperatures Tth, the threshold temperature Tth2 suitable for the multi-gradation mode can be defined by subtracting, from the maximum set temperature Tlim obtained by adding the certain margin to the maximum threshold temperature Tch at which a failure may be likely to occur in the drive signal output circuit 52, the increasing temperature Tmg that is the value of an increase in the temperature of the drive signal output circuit 52 in the image formation period Pimg when the liquid ejecting apparatus 1 is driven in the multi-gradation mode.

In this case, as described above, the increasing temperature Tbin2 is higher than the increasing temperature Tmg. Therefore, the threshold temperature Tth1 suitable for the binary mode is lower than the threshold temperature Tth2 suitable for the multi-gradation mode. In other words, the threshold temperature Tth1 for the binary mode may be lower than the threshold temperature Tth2 for the multi-gradation mode.

Specifically, when the liquid ejecting apparatus 1 operates in the binary mode, the control circuit 100 outputs, to the comparing circuit 70, the temperature threshold signal Sth including the threshold temperature Tth1 as the threshold temperature Tth. When the liquid ejecting apparatus 1 operates in the multi-gradation mode, the control circuit 100 outputs, to the comparing circuit 70, the temperature threshold signal Sth including the threshold temperature Tth2 as the threshold temperature Tth.

That is, the control circuit 100 switches the threshold temperature Tth included in the temperature threshold signal Sth according to the operational mode of the liquid ejecting apparatus 1. Therefore, even when the temperature difference between the increasing temperature Tbin2 that is the value of an increase in the temperature in the image formation period Pimg when the liquid ejecting apparatus 1 is driven in the binary mode and the increasing temperature Tmg that is the value of an increase in the temperature in the image formation period Pimg when the liquid ejecting apparatus 1 is driven in the multi-gradation mode occurs, it is possible to set, to the maximum threshold temperature Tlim, the maximum value of the temperature of the drive signal output circuit 52 that may occur in the image formation period Pimg. As a result, the possibility that the temperature of the drive signal output circuit 52 may reach the maximum threshold temperature Tch is reduced and the possibility that the liquid ejecting apparatus 1 may have an excessive specification is reduced.

The drive signal output circuit 52 is an example of a drive signal output unit. The drive signal COM output by the drive signal output circuit 52 and the drive signals VOUT based on the drive signal COM are an example of a drive signal. In addition, the cooling mechanism 82 is an example of a cooling unit. The power supply circuit 80 that supplies cooling power Pcl to the cooling mechanism 82 is an example of a power supply unit. Furthermore, the temperature detecting circuit 72 is an example of a temperature detecting unit. The comparing circuit 70 that compares the detected temperature Tmp output by the temperature detecting circuit 72 with the threshold temperature Tth is an example of a comparing unit. The threshold temperature Tth is an example of an abnormal temperature threshold. The wiring A through which the head control signal DI including the setting information signal SP and the ejection control signal SI is transferred to the drive signal selecting circuit 200 is an example of a first wiring. The wiring B through which the drive signal COM is transferred is an example of a second wiring.

In addition, the binary mode is an example of a first mode. The drive signal COM in the binary mode is an example of a first drive signal. The frequency of the drive signal COM in the binary mode according to the latch cycle Plat of the time periods p1 and p2 is an example of a first frequency. Furthermore, the multi-gradation mode is an example of a second mode. The drive signal COM in the multi-gradation mode is an example of a second drive signal. The frequency of the drive signal COM in the multi-gradation mode according to the latch cycle Plat of the time periods p1 to p4 is an example of a second frequency. The setting information signal SP included in the head control signal DI is an example of a setting information signal group. The ejection control signal SI included in the head control signal DI is an example of an ejection control signal group. At least one of the trapezoidal waveforms Dp11, Dp21, Dp31, Dp41, Dp12, and Dp42 that is included in the drive signal COM is an example of a drive waveform. The setting signal Q1 included in the setting information signal SP is an example of first setting information. The setting signal Q2 included in the setting information signal SP is an example of second setting information.

6. Effects

As described above, the liquid ejecting apparatus 1 according to the present embodiment has the binary mode in which the drive signal output circuit 52 outputs, to the ejecting units 600, the drive signal COM of the frequency based on the latch cycle PLAT including the two time periods p1 and p2, and the multi-gradation mode in which the drive signal output circuit 52 outputs, to the ejecting units 600, the drive signal COM of the frequency lower than the frequency of the drive signal COM in the binary mode and based on the latch cycle Plat including the four time periods p1 to p4. In the binary mode, an image can be formed on the medium P at a high speed. In the multi-gradation mode, a high-resolution image can be formed on the medium P. In the liquid ejecting apparatus 1, since the two operational modes are different, the value of an increase in the temperature of the drive signal output circuit 52 in the binary mode is different from the value of an increase in the temperature of the drive signal output circuit 52 in the multi-gradation mode. Therefore, when the threshold temperature Tth is set based on the value of an increase in the temperature of the drive signal output circuit 52 in the operational mode in which an increase in the temperature in the image formation period Pimg is smaller, and the liquid ejecting apparatus 1 operates in the operational mode in which an increase in the temperature is larger, the temperature of the drive signal output circuit 52 may reach the maximum threshold temperature Tch. On the other hand, when the threshold temperature Tth is set based on the value of an increase in the temperature of the drive signal output circuit 52 in the operational mode in which an increase in the temperature in the image formation period Pimg is larger, and the liquid ejecting apparatus 1 operates in the operational mode in which an increase in the temperature is smaller, the temperature of the drive signal output circuit 52 may be excessively lower than the maximum threshold temperature Tch, and the liquid ejecting apparatus 1 may have an excessive specification.

To avoid the above-described problems, the liquid ejecting apparatus 1 has a configuration in which the amount of power supplied by the power supply circuit 80 to the cooling mechanism 82 in the binary mode is larger than the amount of power by the power supply circuit 80 to the cooling mechanism 82 in the multi-gradation mode. Therefore, it is possible to reduce the temperature difference between the increasing temperature Tbin that is the value of an increase in the temperature in the image formation period Pimg when the liquid ejecting apparatus 1 is driven in the binary mode and the increasing temperature Tmg that is the value of an increase in the temperature in the image formation period Pimg when the liquid ejecting apparatus 1 is driven in the multi-gradation mode.

As a result, when the threshold temperature Tth is set based on the increasing temperature Tmg of the drive signal output circuit 52 in the image formation period Pimg when the liquid ejecting apparatus 1 operates in the multi-gradation mode in which an increase in the temperature is smaller, the possibility that the temperature of the drive signal output circuit 52 may reach the maximum threshold temperature Tch is reduced even when the liquid ejecting apparatus 1 operates in the binary mode in which an increase in the temperature is larger. When the threshold temperature Tth is set based on the increasing temperature Tbin of the drive signal output circuit 52 in the image formation period Pimg when the liquid ejecting apparatus 1 operates in the binary mode in which an increase in the temperature is larger, the difference between the increasing temperature Tbin and the increasing temperature Tmg is small and the possibility that the temperature of the drive signal output circuit 52 may be excessively lower than the maximum threshold temperature Tch is reduced even when the liquid ejecting apparatus 1 operates in the multi-gradation mode in which an increase in the temperature is smaller.

That is, in the liquid ejecting apparatus 1 according to the present embodiment, it is possible to meet the demand for further improvement of the image quality of the liquid ejecting apparatus 1 and for faster image formation on the medium P, and solve the problems with heat generated in the drive signal output circuit 52 due to the difference between the operational modes of the liquid ejecting apparatus 1.

7. Modifications

The case where the number of gray levels of dots formed on the medium P in the multi-gradation mode is four in the above-described liquid ejecting apparatus 1 according to the present embodiment is exemplified above. However, the number of gray levels of dots formed on the medium P in the multi-gradation mode is not limited to four and may be five or more. In this case, the head control signal DI may include, as the ejection control signal SI, middle-level ejection data SIM1 to SIMn in addition to the upper-level ejection data SIH1 to SIHn and the lower-level ejection data SIL1 to SILn that define amounts of the ink to be ejected from the nozzles 651 included in the ejecting units 600[1] to 600[*n*]. That is, the amount of the ink to be ejected from each of the nozzles 651 included in the ejecting units 600[1] to 600[*n*] may be defined by data of 3 bits or more.

In addition, in the liquid ejecting apparatus 1 according to the present embodiment, the drive signal selecting circuit 200 selects or does not select a signal waveform included in the one drive signal COM based on the latch signal LAT, the change signal CH, the clock signal SCK, and the head control signal DI, thereby generating the drive signals VOUT. However, the drive signal output circuit 52 may output a drive signal COMA and a drive signal COMB as the drive signal COM, and the drive signal selecting circuit 200 may select or not select a signal waveform included in the drive signal COMA in each of the time periods p1 to pm and select or not select a signal waveform included in the drive signal COMB in each of the time periods p1 to pm based on the latch signal LAT, the change signal CH, the clock signal SCK, and the head control signal DI, generate drive signals VOUT, and output the generated drive signals VOUT to the ejecting units 600.

Although the embodiments and the modifications are described above, the present disclosure is not limited to the embodiments and can be implemented in various manners without departing from the gist of the present disclosure. For example, the embodiments can be appropriately combined.

The present disclosure includes substantially the same configuration (for example, a configuration in which functions, methods, and results are the same as those described above, or a configuration in which purposes and effects are the same as those described above) as the configuration described in the embodiment. In addition, the present disclosure includes a configuration in which a part that is not essential for the configuration described in the embodiment is replaced with another part. In addition, the present disclosure includes a configuration in which the same effects as those of the configuration described in the embodiment are obtained or a configuration in which the same purposes as those of the configuration described in the embodiment can be achieved. Furthermore, the present disclosure includes a configuration in which a known technique is added to the configuration described in the embodiment.

The following contents are derived from the above-described embodiments and the above-described modifications.

According to an aspect, a liquid ejecting apparatus includes an ejecting unit that ejects liquid when a drive signal is supplied to the ejecting unit; a drive signal output unit that outputs the drive signal; a cooling unit that cools the drive signal output unit; and a power supply unit that supplies power to the cooling unit. The liquid ejecting apparatus has a first mode in which the drive signal output unit outputs a first drive signal of a first frequency as the drive signal to the ejecting unit, and a second mode in which the drive signal output unit outputs a second drive signal of a second frequency lower than the first frequency as the drive signal to the ejecting unit. An amount of power supplied by the power supply unit to the cooling unit in the first mode is larger than an amount of power supplied by the power supply unit to the cooling unit in the second mode.

The liquid ejecting apparatus has the first mode in which the drive signal output unit outputs the first drive signal of the first frequency as the drive signal to the ejecting unit, and the second mode in which the drive signal output unit outputs the second drive signal of the second frequency lower than the first frequency as the drive signal to the ejecting unit. In this case, the first frequency of the first drive signal output by the drive signal output unit in the first mode is higher than the second frequency of the second drive signal output by the drive signal output unit in the second mode. Therefore, an increase in the temperature of the drive signal output unit in the first mode is higher than an increase in the temperature of the drive signal output unit in the second mode. Even when the liquid ejecting apparatus has the two operational modes in which the values of the increases in the temperature are different, the amount of power supplied by the power supply unit to the cooling unit in order to cool the drive signal output unit in the first mode is larger than the amount of power supplied by the power supply unit to the cooling unit in order to cool the drive signal output unit in the second mode, and thus it is possible to reduce the difference between the value of the increase in the temperature of the drive signal output unit in the first mode and the value of the increase in the temperature of the drive signal output unit in the second mode. As a result, even when the liquid ejecting apparatus has the two operational modes in which the values of the increases in the temperature are different, the possibility that an abnormality may occur in the drive signal output unit due to an excessive increase in the temperature of the drive signal output unit in each operational mode is reduced and the possibility that the liquid ejecting apparatus may have an excessive specification due to excessive suppression of the temperature of the drive signal output unit in each operational mode is reduced.

That is, since the liquid ejecting apparatus has the plurality of operational modes, it is possible to solve the problems with heat generated in the drive signal output unit.

According to the aspect, the liquid ejecting apparatus may further include a temperature detecting unit that detects a temperature; and a comparing unit that compares the result of the detection by the temperature detecting unit with an abnormal temperature threshold. The abnormal temperature threshold in the first mode may be lower than the abnormal temperature threshold in the second mode.

According to the liquid ejecting apparatus, in the comparing unit that compares the temperature of the drive signal output unit with the abnormal temperature threshold, the abnormal temperature threshold in the first mode in which the value of an increase in the temperature is larger is set lower than the abnormal temperature threshold in the second mode in which the value of an increase in the temperature is smaller. Therefore, it is possible to reduce the difference between the maximum reachable temperature of the drive signal output unit in the first mode and the maximum reachable temperature of the drive signal output unit in the second mode. Therefore, even when the value of an increase in the temperature in the first mode is different from the value of an increase in the temperature in the second mode, the possibility that an abnormality may occur in the drive signal output unit due to an excessive increase in the temperature of the drive signal output unit is reduced and the possibility that the liquid ejecting apparatus may have an excessive specification due to excessive suppression of the temperature of the drive signal output unit is reduced.

According to the aspect, in the liquid ejecting apparatus, when the result of the detection is larger than the abnormal temperature threshold, the drive signal output unit may stop outputting the drive signal.

According to the liquid ejecting apparatus, when the temperature of the drive signal output unit is abnormal, the drive signal output unit stops operating so as to reduce the possibility that the abnormal temperature may adversely affect the liquid ejecting apparatus. As a result, the reliability of the liquid ejecting apparatus is improved.

According to the aspect, in the liquid ejecting apparatus, when the result of the detection is larger than the abnormal temperature threshold, the power supply unit may increase an amount of power to be supplied to the cooling unit.

According to the liquid ejecting apparatus, when the temperature of the drive signal output unit is abnormal, the power supply unit increases the amount of power to be supplied to the cooling unit to improve a capacity of cooling the drive signal output unit by the cooling unit. As a result, an increase in the temperature of the drive signal output unit is reduced.

According to the aspect, the liquid ejecting apparatus may further include a first wiring through which a setting information signal group including first setting information and second setting information and configured to set a rule for selecting a drive waveform included in the drive signal, and an ejection control signal group configured to control gray levels of dots to be formed on a medium by ejecting the liquid from the ejecting unit are transferred; a second wiring through which the drive signal is transferred; and a selecting circuit that switches, based on the setting information signal group and the ejection control signal group, whether to supply the drive waveform to the ejecting unit. The number of gray levels of the dots formed on the medium in the first mode may be smaller than the number of gray levels of the dots formed on the medium in the second mode. The setting information signal group in the first mode may include the second setting information obtained by inverting bit data of the first setting information.

According to the liquid ejecting apparatus, it is possible to implement the two operational modes in which the numbers of gray levels of dots are different without changing a hardware configuration. Therefore, the versatility of the liquid ejecting apparatus is improved.

According to the aspect, in the liquid ejecting apparatus, a data size of the setting information signal group in the first mode may be equal to a data size of the setting information signal group in the second mode, and a data size of the ejection control signal group in the first mode may be smaller than a data size of the ejection control signal group in the second mode.

According to the liquid ejecting apparatus, even when the setting information signal group in the first mode includes the second setting information obtained by inverting the bit data of the first setting information, and thus the data size of the ejection control signal group in the first mode is reduced, it is possible to implement the two operational modes in which the numbers of gray levels of dots are different without changing a hardware configuration, and the data size of the ejection control signal group in the first mode is reduced, whereby it is possible to reduce the possibility that the data size of the ejection control signal group in the first mode may be the rate-limiting factor for the speed at which the ink is ejected onto the medium, and as a result, it is possible to improve the speed at which the ink is ejected onto the medium in the first mode.

According to the aspect, in the liquid ejecting apparatus, the first mode may be a binary mode and the second mode may be a multi-gradation mode.

What is claimed is:

1. A liquid ejecting apparatus comprising:

an ejecting unit that ejects liquid when a drive signal is supplied to the ejecting unit;

a drive signal output unit that outputs the drive signal;

a cooling unit that cools the drive signal output unit; and a power supply unit that supplies power to the cooling unit, wherein the liquid ejecting apparatus has a first mode in which the drive signal output unit outputs a first drive signal of a first frequency as the drive signal to the ejecting unit, and a second mode in which the drive signal output unit outputs a second drive signal of a second frequency lower than the first frequency as the drive signal to the ejecting unit, an amount of power supplied by the power supply unit to the cooling unit in the first mode is larger than an amount of power supplied by the power supply unit to the cooling unit in the second mode, and the first mode is a binary mode, and the second mode is a multi-gradation mode.

2. The liquid ejecting apparatus according to claim 1, further comprising:

a temperature detecting unit that detects a temperature; and a comparing unit that compares the result of the detection by the temperature detecting unit with an abnormal temperature threshold, wherein the abnormal temperature threshold in the first mode is lower than the abnormal temperature threshold in the second mode.

3. The liquid ejecting apparatus according to claim 2, wherein when the result of the detection is larger than the abnormal temperature threshold, the drive signal output unit stops outputting the drive signal.

4. The liquid ejecting apparatus according to claim 2, wherein when the result of the detection is larger than the abnormal temperature threshold, the power supply unit increases an amount of power to be supplied to the cooling unit.

5. The liquid ejecting apparatus according to claim 1, further comprising:

a first wiring through which a setting information signal group including first setting information and second setting information and configured to set a rule for selecting a drive waveform included in the drive signal, and an ejection control signal group configured to control gray levels of dots to be formed on a medium by ejecting the liquid from the ejecting unit are transferred;

a second wiring through which the drive signal is transferred; and a selecting circuit that switches, based on the setting information signal group and the ejection control signal group, whether to supply the drive waveform to the ejecting unit, wherein the number of gray levels of the dots formed on the medium in the first mode is smaller than the number of gray levels of the dots formed on the medium in the second mode, and the setting information signal group in the first mode includes the second setting information obtained by inverting bit data of the first setting information.

6. The liquid ejecting apparatus according to claim 5, wherein a data size of the setting information signal group in the first mode is equal to a data size of the setting information signal group in the second mode, and a data size of the ejection control signal group in the first mode is smaller than a data size of the ejection control signal group in the second mode.

* * * * *